(12) United States Patent
Wingate-Whyte et al.

(10) Patent No.: US 9,786,013 B2
(45) Date of Patent: Oct. 10, 2017

(54) DASHBOARD INTERFACE, PLATFORM, AND ENVIRONMENT FOR MATCHING SUBSCRIBERS WITH SUBSCRIPTION PROVIDERS AND PRESENTING ENHANCED SUBSCRIPTION PROVIDER PERFORMANCE METRICS

(71) Applicant: AON GLOBAL RISK RESEARCH LIMITED, Hamilton (BM)

(72) Inventors: Gregory Wingate-Whyte, London (GB); Stephen P. McGill, Ware (GB); Stephen W. Cross, Dublin (IE)

(73) Assignee: Aon Global Risk Research Limited, Hamilton (BM)

( * ) Notice: Subject to any disclaimer, the term of this patent is extended or adjusted under 35 U.S.C. 154(b) by 0 days.

(21) Appl. No.: 14/977,408

(22) Filed: Dec. 21, 2015

(65) Prior Publication Data

US 2017/0154337 A1    Jun. 1, 2017

Related U.S. Application Data

(60) Provisional application No. 62/261,241, filed on Nov. 30, 2015.

(51) Int. Cl.
*G06Q 40/00* (2012.01)
*G06Q 40/08* (2012.01)
*G06Q 20/40* (2012.01)
*G06Q 30/06* (2012.01)
*G06Q 30/02* (2012.01)

(52) U.S. Cl.
CPC .......... *G06Q 40/08* (2013.01); *G06Q 20/405* (2013.01); *G06Q 20/4016* (2013.01); *G06Q 30/0282* (2013.01); *G06Q 30/0629* (2013.01); *G06Q 30/0631* (2013.01)

(58) Field of Classification Search
CPC ...................................................... G06Q 40/08
See application file for complete search history.

(56) References Cited

U.S. PATENT DOCUMENTS

2008/0133290 A1*   6/2008   Siegrist .................. G06Q 50/22
                                                                         705/2
2010/0235295 A1*   9/2010   Zides ................. G06Q 30/0282
                                                                         705/347

* cited by examiner

*Primary Examiner* — Eric T Wong
(74) *Attorney, Agent, or Firm* — Gardella Grace P.A.

(57) ABSTRACT

Systems and methods for matching subscribers with subscription providers include gathering, via a network from one or more remote computing systems, claims data, performance data, and service data regarding a number of providers; determining, by processing circuitry of a computing device based on the claims data, the performance data, and the service data, one or more provider metrics for each provider of the number of providers; calculating, by the processing circuitry based on the one or more provider metrics, one or more relationships between a number of subscribers and each provider of the plurality of providers; and ranking, by the processing circuitry, the number of providers based at least on part on the one or more relationships.

16 Claims, 21 Drawing Sheets

| Carrier | Country | Product | Segment | Region | Insurer | Metric 1 | Metric 2 | Metric 3 | Metric 4 |
|---|---|---|---|---|---|---|---|---|---|
| 1 | All | All | All | All | AAA co | 0 | 0.625 | - | 5 |
| 2 | All | All | All | APAC | AXIS | 7.84 | 2.55 | 4.23 | 5.70 |
| 3 | Argentina | Marine | Large | LATAM | SANCOR | 2.94 | 0.625 | 7.223 | 4.25 |
| 4 | Austria | Casuality | Small | Europe | ZURICH | 9.76 | - | 3.59 | 5 |
| 5 | Austria | Financial | All | Europe | AIG | 9.82 | - | - | - |
| 6 | Austria | Financial | Large | Europe | AIG | 9.82 | 0.625 | - | 5 |
| 7 | Austria | Property | All | Europe | AIG | - | 0.625 | 4.58 | 5 |
| 8 | Italy | Aviation | All | Europe | ACE | 9.71 | 0.625 | 3.02 | 5.01 |
| 9 | Italy | Aviation | All | Europe | AIG | 9.82 | 0.625 | 5.39 | 1.46 |

| Carrier | Country | Product | Segment | Region | Insurer | Metric 1 | Metric 2 | Metric 3 | Metric 4 |
|---|---|---|---|---|---|---|---|---|---|
| 1 | All | All | All | All | AAA co | 0 | 0.625 | (2.23) | 5 |
| 2 | All | All | All | APAC | AXIS | 7.84 | 2.55 | 4.23 | 5.70 |
| 3 | Argentina | Marine | Large | LATAM | SANCOR | 2.94 | 0.625 | 7.223 | 4.25 |
| 4 | Austria | Casuality | Small | Europe | ZURICH | 9.76 | (2.70) | 3.59 | 5 |
| 5 | Austria | Financial | All | Europe | AIG | 9.82 | (0.625) | (5.60) | (5) |
| 6 | Austria | Financial | Large | Europe | AIG | 9.82 | 0.625 | (5.74) | 5 |
| 7 | Austria | Property | All | Europe | AIG | (9.82) | 0.625 | 4.58 | 5 |
| 8 | Italy | Aviation | All | Europe | ACE | 9.71 | 0.625 | 3.02 | 5.01 |
| 9 | Italy | Aviation | All | Europe | AIG | 9.82 | 0.625 | 5.39 | 1.46 |

*Fig. 8*

| Customer | Country | Product | Eff. Month | Exp. Month | Total Prem. | Revenue | Commission | Fees |
|---|---|---|---|---|---|---|---|---|
| 1 | All | All | 2015-3 | 2016-3 | 16,184,827 | 694,010 | 694,010 | --- |
| 2 | All | All | 2015-4 | 2016-3 | 4,177,851 | 261,116 | 261,116 | --- |
| 3 | Argentina | Marine | 2015-3 | 2016-3 | 1,395,714 | 125,614 | 125,614 | --- |
| 4 | Austria | Casuality | 2015-3 | 2016-3 | 1,199,943 | 107,986 | 107,986 | --- |
| 5 | Austria | Financial | 2015-4 | 2016-3 | 2,127,977 | 319,197 | 319,197 | --- |
| 6 | Austria | Financial | 2015-3 | 2016-3 | 1,524,097 | 31,701 | 31,701 | --- |
| 7 | Austria | Property | 2015-4 | 2016-3 | 1,017,246 | 563,200 | 563,200 | --- |
| 8 | Italy | Aviation | 2015-1 | 2016-1 | 9,371,096 | --- | --- | --- |
| 9 | Italy | Aviation | 2015-3 | 2016-3 | 4,590,266 | --- | --- | --- |

Figure 14:
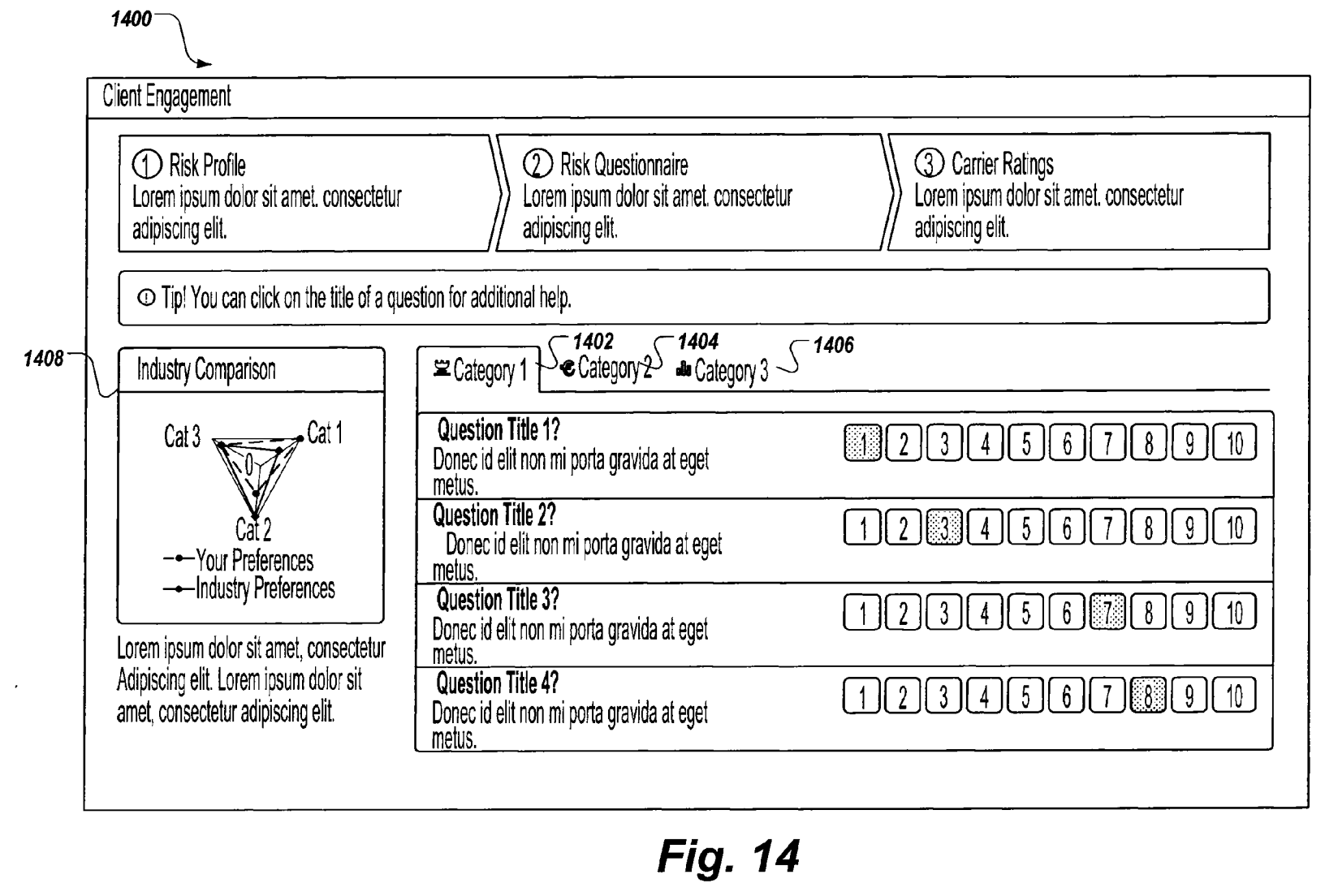

Client Engagement

① Risk Profile
Lorem ipsum dolor sit amet, consectetur adipiscing elit.

② Risk Questionnaire
Lorem ipsum dolor sit amet, consectetur adipiscing elit.

③ Carrier Ratings
Lorem ipsum dolor sit amet, consectetur adipiscing elit.

⊙ Tip! You can click on the title of a question for additional help.

☒ Category 1    ⊕ Category 2    ☒ Category 3

Question Title 1?
Donec id elit non mi porta gravida at eget metus.
[1] [2] [3] [4] [5] [6] [7] [8] [9] [10]

Question Title 2?
Donec id elit non mi porta gravida at eget metus.
[1] [2] [3] [4] [5] [6] [7] [8] [9] [10]

Question Title 3?
Donec id elit non mi porta gravida at eget metus.
[1] [2] [3] [4] [5] [6] [7] [8] [9] [10]

Question Title 4?
Donec id elit non mi porta gravida at eget metus.
[1] [2] [3] [4] [5] [6] [7] [8] [9] [10]

Industry Comparison

Cat 1, Cat 2, Cat 3
-•- Your Preferences
—— Industry Preferences

Lorem ipsum dolor sit amet, consectetur Adipiscing elit. Lorem ipsum dolor sit amet, consectetur adipiscing elit.

DASHBOARD INTERFACE, PLATFORM, AND ENVIRONMENT FOR MATCHING SUBSCRIBERS WITH SUBSCRIPTION PROVIDERS AND PRESENTING ENHANCED SUBSCRIPTION PROVIDER PERFORMANCE METRICS

CROSS-REFERENCE TO RELATED APPLICATIONS

The present application is related to and claims the benefit of U.S. Provisional Application No. 62/261,241 entitled "Dashboard Interface, Platform, and Environment for Matching Subscribers with Subscription Providers and Presenting Enhanced Subscription Provider Performance Metrics" and filed on Nov. 30, 2015, the entire contents of which are hereby incorporated by reference.

SUMMARY OF ILLUSTRATIVE EMBODIMENTS

The implementations described herein are directed toward a subscriber-provider matching system and environment that incorporates customer feedback into determinations of compatibility between providers and subscribers. The subscriber-provider matching system and environment may also perform real-time processing of data from multiple data sources that are received at various update frequencies in order to adaptively and predictively update metrics associated with the providers. Subscribers may be provided with the ability to select providers based on scores and rankings determined in real-time that correspond to an amount of compatibility between attributes of the providers and risk preferences of the subscribers. Participants, such as the subscribers, providers, and intermediate participants can interact with the subscriber-provider matching system and environment via one or more graphical user interfaces where the participants can input survey data, preferences, and feedback. The participants can also view provider rankings, performance metrics, and comparison data via the graphical user interface screens on external devices.

BRIEF DESCRIPTION OF THE FIGURES

FIG. 8 is a diagram of an exemplary dense matrix;

FIG. 10 is a diagram of an exemplary test harness report;

FIGS. 11 through 15 illustrate screenshots of user interface screens;

DETAILED DESCRIPTION OF ILLUSTRATIVE EMBODIMENTS

Figure 1:
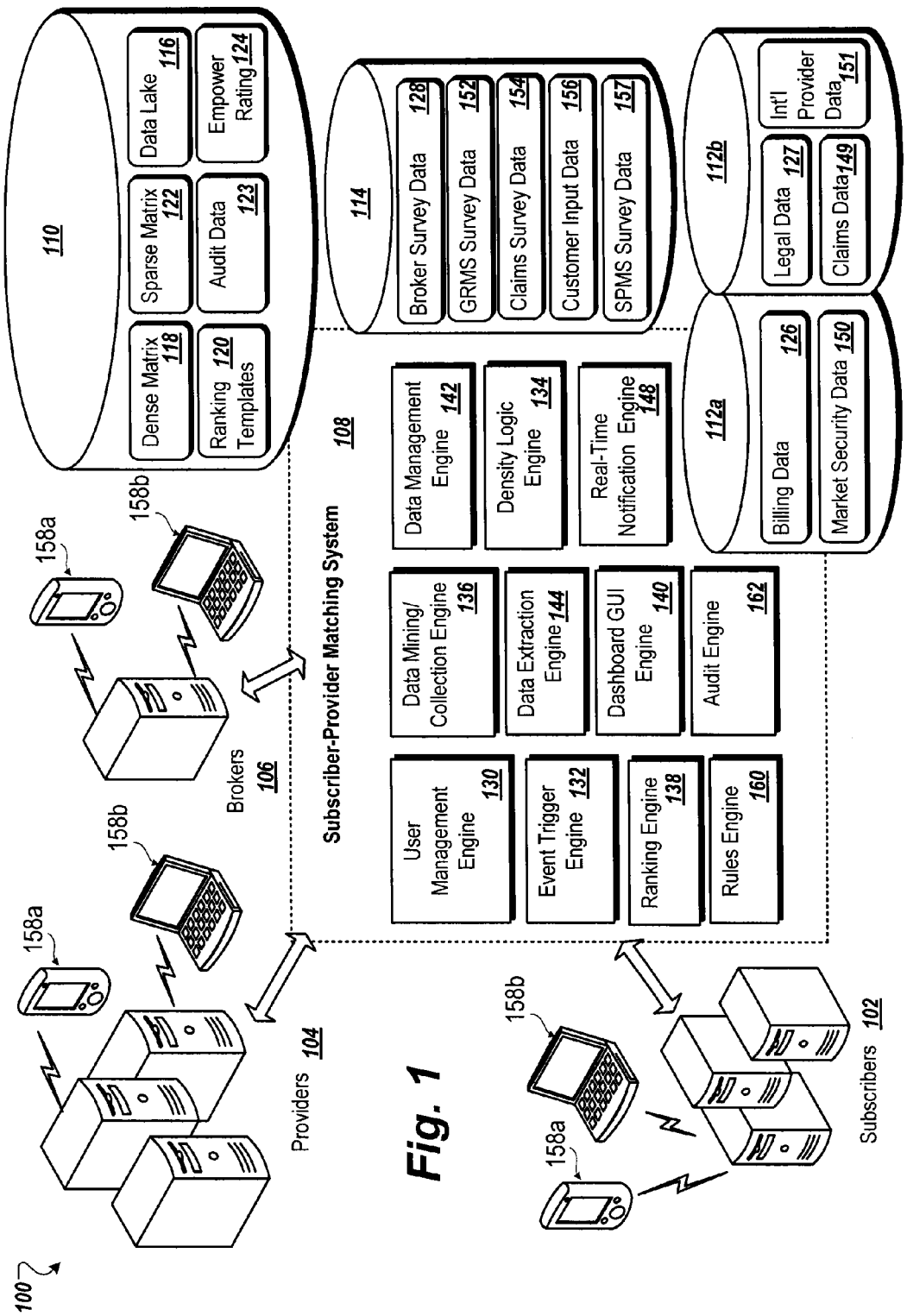
FIG. 1 is a diagram of an example environment for a subscriber-provider matching system.

FIG. 1 is a diagram of an example environment 100 for a subscriber-provider matching system 108. The diagram illustrates a series of interactions between one or more participants and the subscriber-provider matching system 108 which determines connections between providers such as insurance and/or reinsurance providers 104 and subscribers that include one or more subscribers 102 that receive products and/or services from the providers such as insurance protection. In one implementation, the subscriber-provider matching system 108 determines rankings for the providers 104 with respect to subscribers 102 based on identified relationships and commonalities between the products and/or services offered by the providers 104 and needs of the subscribers 102. For example, the subscriber-provider matching system 108 can identify the providers 104 that are most relevant to specific needs of the subscribers 102 that can include product segment, region, or speed of claim payment.

In certain embodiments, the subscriber-provider matching system 108 categorizes the specific needs and/or risks of the subscribers 102 into one or more categories, such as amount of protection, geographic footprint, speed and capability to provide claims payment, and overall performance and ranks the providers 104 in light of the categorized needs of the subscribers 102. The subscriber-provider system 108 also receives real-time feedback of market performance as well as client and carrier feedback, which is used to update metrics associated with determining rankings of the providers 104. The subscriber-provider matching system 108 can also use survey inputs from intermediate participants, such as intermediate participants 106, to further refine the carrier rankings.

The subscribers 102 include a plurality of computing devices and databases distributed across a widely dispersed network that may be distributed across a large, international geographic area. The customer network can be separate and independent from any network associated with any other participant in the subscriber-provider matching environment 100, such as the intermediate participants 106 or providers 104. In addition, the data handled and stored by the subscribers 102 may be in a different format than the data handled and stored by the other participants of in the subscriber-provider environment 100. The subscribers 102 provide inputs to the subscriber-provider matching system 108 that may include global risk management surveys (GRMSs) 152 that may provide feedback to the subscriber-provider management system 108 regarding performance of one or more providers 104. The data provided to the subscriber-provider matching system 108 from the subscribers 102 may be independent from the other participants and in a different format than the data provided by the intermediate participants 106 and providers 104.

The providers 104 include a plurality of computing devices and databases distributed across a widely dispersed network that may be distributed across a large, international geographic area. The provider network can be separate and independent from any network associated with any other participant in the subscriber-provider matching environment 100, such as the intermediate participants 106 or subscribers 102. In addition, the data handled and stored by the providers 104 may be in a different format than the data handled and stored by the other participants of in the subscriber-provider environment 100. The providers 104 provide inputs to the subscriber-provider matching system 108 that may include claims survey 154 results that can include a rating associated with ease of subscriber-provider interaction, industry segment served, trends in types of claims processed by the providers 104. The data provided to the subscriber-provider matching system 108 from the providers 104 may be independent from the other participants and in a different format than the data provided by the intermediate participants 106 and subscribers 102. In addition, the providers 104 can receive data outputs from the subscriber-provider matching system 108 with respect to how the providers 104 were ranked with respect to a particular subscriber 102.

The intermediate participants 106 include a plurality of computing devices and databases distributed across a widely dispersed network that may be distributed across a large, international geographic area. The intermediate participant network can be separate and independent from any network associated with any other participant in the subscriber-provider matching environment 100, such as the subscribers 102 or providers 104. In addition, the data handled and stored by the intermediate participants 106 may be in a different format than the data handled and stored by the other participants of in the subscriber-provider environment 100. The intermediate participants 106 provide inputs to the subscriber-provider matching system 108 that may include broker surveys 128 that may provide feedback to the subscriber-provider management system 108 regarding performance of one or more providers 104. The data provided to the subscriber-provider matching system 108 from the intermediate participants 106 may be independent from the other participants and in a different format than the data provided by the subscribers 102 or providers 104.

The subscriber-provider matching system 108 includes one or more engines or modules that perform processes associated with matching and ranking the providers 104 based on risks and/or needs of the subscribers 102. References to the engines or modules throughout the disclosure are meant to refer to software processes executed by circuitry of one or more processing circuits, which can also be referred to interchangeably as processing circuitry. In one example, a user management engine 130 includes one or more processes associated with providing an interface to interact with one or more users (e.g., individuals employed by or otherwise associated with the providers 104, subscribers 102, and/or intermediate participants 106) within the subscriber-provider environment 100. The processes performed by the engines of the subscriber-provider matching system 108 can be executed in real-time in order to provide an immediate response to a system input. In addition, the processes can also be performed automatically in response to a process trigger that can include the reception of data from a data repository, a participant, or another processing engine. For example, the user management engine 130 can control connection and access to the subscriber-provider matching system 108 by the providers 104, subscribers 102, and intermediate participants 106 via authentication interfaces at one or more external devices 158 of the providers 104, subscribers 102, and intermediate participants 106.

The subscriber-provider matching system 108 also includes a data mining/collection engine 136 that controls the gathering of survey data from the providers 104, subscribers 102, and intermediate participants 106 as well as the collection of real-time market security data 150 and billing data 126. In some implementations, the data mining/collection engine 136 receives data from one or more sources that may have an effect on relationships between the subscribers 102 and providers 104 and provider selections made by the subscribers 102. For example, the data mining/collection engine 136 can receive automatically and/or continuously updated data associated with market securities, billing data, or insurance rate data. In addition, the data mining/collection engine 136 can perform web crawling processes to access the updated data from one or more websites associated with market securities and other insurance data. In addition, the data mining/collection engine 136 can receive manually entered information from the participants in the subscriber-provider matching environment 100, such as broker surveys 128, global risk management surveys (GRMSs) 152, claims surveys 154, and customer input data 156. In some implementations, the data mining/collection engine 136 monitors claims settlement processing systems and automatically outputs a customer survey request to the external devices 158 of the subscribers 102 for each claims settlement that occurs.

In addition, the data mining/collection engine 136 can provide an interface between the subscriber-provider matching system 108 and other systems associated with monitoring or managing interactions between subscribers 102, providers 104, and other market entities. For example, the other systems can include the claims settlement processing system where the providers 104 interact with subscribers 102 to process claim, a system where the brokers 102 purchase services and/or products from the providers 104 on behalf of the subscribers 102, or a data analytics system that processes market data and transactional data to determine trends and statistics associated with the subscribers 102, providers 104, and intermediate participants 106.

In addition, the subscriber-provider matching system 108 includes a data management engine 142 that organizes the survey data received by the subscriber-provider matching system 108 and also controls data handling during execution of the processes associated with determining customized ratings of the providers 104 based on predetermined criteria, such as needs and/or risk preferences of the subscribers 102. In some implementations, the data management engine 142 processes the data received by the data mining/collection engine 136 and loads received data files to a data lake 116, which can be a database of data files received from the one or more data sources. The data management engine 142 can determine relationships between the data in the data lake 116. For example, the data management engine 142 can link survey data 128, 152, 154, billing data 126, and market security data 150 that include information regarding corresponding providers 104, products, segments, or regions. In addition, the data management engine 142 may perform a data validation/normalization process to configure the received data into a predetermined format compatible with a format of the files within the data lake 116. For example, the data management engine 142 processes the broker surveys 128, GRMSs 152, and claims surveys 154 to determine a format, size, and whether responses to one or more questions of the surveys are answered or unanswered.

The data management engine 142 also controls the interaction of the subscriber-provider matching system 108 with one or more data repositories associated with the subscriber-provider matching environment 100. For example, the data management engine 142 can output automatically updated data to an auto load data repository 112 and manually updated data to a manual load data repository 114. The data management engine 142 can also access any of the data from the data repositories 110, 112, 114 for use by the subscriber-provider matching system 108. For example, data generated during the execution of one or more processes by subscriber-provider matching system 108 can be stored in a process execution data repository 110. The data management engine 142 controls the flow of data between the process execution data repository 110 and the subscriber-provider matching system 108.

The event trigger engine 132 manages the flow of data updates to the subscriber-provider matching system 108. In some implementations, the event trigger data 132 detects updates to broker survey data 128, global risk management survey (GRMS) data 152, claims survey data 154, customer input data 156, or any other type of data collected or controlled by the subscriber-provider matching system 108. For example, the event trigger engine 132 detects modifications or additions to the files of the data lake 116, which may indicate that additional survey data has been received. When a data update is detected at the data lake 116, the event trigger engine 132 loads the updated data files to a data extraction engine 144. The event trigger engine 132 operates in real-time to update the data extraction engine 144 when updated data is received from the data sources. In addition, the event trigger engine 132 operates automatically when updated data is detected in the data lake 116.

In addition, the event trigger engine 132 is configured to detect updates to the data lake 116 from the one or more data sources at multiple update velocities. The update velocity of the data corresponds to a rate or frequency at which the subscriber-provider matching system 108 receives data updates from the data sources, such as the billing data 126, market survey data 150, broker survey data 128, GRMS survey data 152, claims survey data 154, and customer input data 156. In addition, the velocities with which individual participants provide data updates may also vary. For example, a first intermediate participant may provide quarterly broker survey data 128 to the subscriber-provider matching system 108 in March, June, September, and December of a given year while a second intermediate participant may provide bi-annual broker survey data 128 to the subscriber-provider matching system 108 in January and July of a given year. Also, the event trigger engine 132 can also be configured to detect unscheduled updates to the data lake 116. For example, if the second intermediate participant with the January and July scheduled updates submits broker survey data 128 in October, the event trigger engine 132 can detect the data update in real time and determine that the update was unscheduled. The event trigger engine 132 can be configured to detect multiple scheduled and unscheduled updates from a multiple data sources in parallel and in real-time.

In some implementations, the data extraction engine 144 of the subscriber-provider matching system 108 extracts data from the files of the data lake 116 to generate a sparse matrix 122, which includes data values for one or more metrics associated with each of the providers 104. In some implementations, the one or more metrics of the sparse matrix 122 are associated with a particular data source. For example, the data extraction engine can extract a retention score for the providers 104 from the billing data 126 and an intermediate participant rate rating from the broker surveys 128. The resulting sparse matrix 122 may have one or more missing data entries for one or more metrics that represent incomplete data received from the data sources. For example, one or more of the GRMS surveys 152, broker surveys 128, customer input data 156, or claims surveys 154 may be partially completed. In addition, the collected survey data may not address one or more of the providers 104, insurance types, regions, or segments encompassed by the sparse matrix 122. The data extraction engine 144 operates in real-time to update the sparse matrix 122 when updated data is received from the event trigger engine 132. In addition, the data extraction engine 144 operates automatically to process the updated data files received from the event trigger engine 132.

The subscriber-provider matching system 108 also includes a density logic engine 134 that further processes the sparse matrix 122 into a dense matrix 118. In some implementations, the density logic engine 134 determines data values for the missing (null) data entries in the sparse matrix 122 by inheriting data from other entries of the sparse matrix 122 or inferring data based on an amount of correlation between entries of the sparse matrix 122. For example, the density logic engine 134 can determine the missing data entries by determining an amount of correlation between the missing data entries and filled entries in order to provide simulated values for the missing data entries. The filled entries refer to data entries in the sparse matrix 122 that have been filled with data from the data lake 116. In a particular example, lacking data for a particular provider corresponding to the New Zealand marketplace (e.g., the provider just entered the New Zealand marketplace, data corresponding to the New Zealand marketplace is unavailable, etc.), the density logic engine 134 may identify a correlation between New Zealand data values and Australia data values for that particular data value type and replicate the provider's data corresponding to the Australian marketplace to the New Zealand marketplace. In another example, finding multiple correlations between a missing data type's categorization (e.g., industry A) and other categorizations (e.g., industries B, C, and D), the density logic engine 134 may combine data values corresponding to industries B, C, and D to supply an inferred data value for industry A. Inferring and/or inheriting, in further examples, may include applying a weighting or otherwise adjusting the correlating data based upon a particular correlation identified (e.g., the data value corresponding to region P is typically X percent greater than the data value corresponding to region Q). Further, if data associated with a particular data type and a particular provider is available but insufficient (e.g., fewer than a threshold number of values such as survey responses have been received, shorter than a threshold timeframe of data is available, etc.), the density logic engine 134 may combine the available data with additional correlated data to determine an inferred data value. The data extraction engine 144 may flag particular data values as insufficient when populating the sparse matrix for use by the density logic engine. In this manner, in addition or rather than augmenting insufficient data values in preparing the dense matrix, the data extraction engine 144 may neglect any insufficient data values as candidate data for inheritance or inference purposes.

In some implementations, the density logic engine 134 flags or otherwise differentiates each data entry that was fully or partially inherited or inferred. In this manner, upon supplying provider ratings and recommendations to the subscribers 102, the subscribers 102 may be alerted of any recommendations identified based in part upon inherited or inferred data. In some embodiments, the density logic engine 134 may flag "augmentation" of insufficient data through correlation differently than inferring or inheriting a completely missing data value.

In some implementations, the dense matrix 118 output from the density logic engine 134 includes values for all data entries. The density logic engine 134 may operate in realtime to update the dense matrix 118 when an updated sparse matrix 122 is made available by the data extraction engine 144. In addition, the density logic engine 134 may operate automatically to process the updated sparse matrix 122.

The subscriber-provider matching system 108, in some implementations, includes a rules engine 160 that manages data integrity of the metrics and associated data in the sparse matrix 122 and dense matrix 118. In some implementations, the rules engine 160 detects discrepancies between new data values added to the sparse matrix 122 and historic data values, updated data values in to the sparse matrix 122 and present data values in the dense matrix 118, and/or updated data values in the dense matrix 118 and historic dense matrix values based on one or more rules associated with each of the metrics. The rules can include trend rules that flag data entries that exceed thresholds associated with how the data entries change over time. For example, a number of policy renewals for a given year can be one of the metrics included in the sparse matrix 122 or dense matrix 118. In one example, if a number of policy renewals for a specific provider from one year to a next year increases by more than a threshold value or percentage (e.g., over 115%, etc. such as 170%) the rules engine 160 may identify the value as exceeding the allowable variation in number of policy renewals between years. The rules engine 160, in some embodiments, may further determine whether a rationale exists for the increase in policy renewals. In a particular example, the rules engine 160 may access provider data 151 to identify a change in status of the particular provider, such as an expansion of the provider through merger or acquisition, corresponding to the increase in policy renewals. If the rules engine 160 determines that the increase in policy renewals does not appear to have an automatically identifiable rationale, then the rules engine 160 may flag the number of policy renewals as invalid. Flagging invalid data entries, for example, may involve applying a digital tag or identifier to the particular data entry identifying the data as invalid. Further, flagging the data as invalid may involve automatically triggering a manual review of the data (e.g., causing issuance of an electronic message to an operator of the subscriber-provider matching system 108 regarding the data inconsistency). The operator, upon reviewing and, optionally, fixing the data value may clear the data flag. Upon completion of data validation, the rules engine 160 may release the dense matrix 118 for use by a ranking engine 138.

Using the dense matrix 118, the ranking engine 138, in some implementations, ranks the providers 104 based on a determined amount of compatibility between the providers 104 and the subscribers 102. The amount of compatibility between the providers 104 and the subscribers 102 can be measured, for example, by an empower rating (ER) for each of the providers 104 with respect to each customer 102. For example, for a given customer 102, the ranking engine 138 assigns a score from zero to five indicating how well the providers 104 meet certain risk preference criteria of the subscribers 102. For example, a payment criterion can be based on an amount of money in the ultimate payout, the speed at which the claim is paid out, and the overall claims service provided by the carries 104. The ranking engine 138 can determine the ERs for the providers 104 based on needs, risk preferences, and/or priorities of the subscribers 102 that are input at the external devices 158 via one or more user interface screens as well as weighting factors associated with each of the metrics of the dense matrix 116.

In some implementations, the ranking engine 138 identifies inferred or inherited data when determining provider rankings and recommendations. The ranking engine 138 may identify inferred or inherited data corresponding to a key subscriber preference (e.g., one of the X highest weighted subscriber preferences, a subscriber preference weighted at least Y on a scale from 1 to N, etc.), and provide a caveat, upon recommending the particular subscriber associated with the inferred or inherited data, to the subscriber regarding the recommendation's basis upon partially inferred or inherited data. The caveat, further to the example, may include a highlighting, brief comment, color change, or other identifier signifying a recommendation based partially on inferred or inherited data. In other embodiments, ratings and recommendations may be weighted based in part on a determination that a portion of the data depended upon for the recommendation exceeds a predetermined threshold.

The ranking engine 138, in some implementations, adaptively and predictively updates the weighting factors for each of the metrics based on learned trends in the market security data 150, billing data 126, and other data sources as well as the risk preferences of the subscribers 102. For example, the ranking engine 138 may develop a typical (e.g., mean, average, or otherwise combined) set of risk preferences associated with groupings of subscribers 102 (e.g., subscribers of a particular type of product, subscribers operating in a particular geographic region) based upon risk preferences received from the subscribers and/or derived risk preferences of the subscribers 102 (e.g., based upon historical performance of providers selected by each subscriber 102). The derived risk preferences, for example, may be developed based upon risk exposure metrics developed by the ranking engine 138 through analysis of historic performance data and survey data associated with individual providers 104 providing products to the subscribers 102. Weighting factors for various metrics considered by the ranking engine 138 may take into account the typical risk preferences to identify the most important risk preference factors to the subscribers as a whole. For example, the ranking engine 138 may alter weighting factors of metrics based upon the risk trends in the subscriber base as evidenced by the received and optionally derived risk preferences.

The ranking engine 138, in some embodiments, separates subscribers 102 into peer groups based upon characteristics of individual subscribers 102 (e.g., size, industry, maturity, etc.) for generation of typical risk preferences/adaptation of weighting factors. In another example, the ranking engine 138, in real-time based upon a subscriber request for submitting personalized risk preferences, identifies a number of peers most similar to the subscriber based on characteristics of the subscriber and/or the type subscription requested by the subscriber. For example, the ranking engine 138 may identify three to twelve peers most similar to the requesting subscriber and generate a typical set of risk preferences of the subscriber's peers for presentation to the subscriber when obtaining individualized risk preferences from the subscriber.

The ranking engine 138, in some implementations, operates in real-time to determine rankings for the providers 104 in response to receiving needs or risk preferences input from the subscribers 102 via customer input UI screens. To aid the subscribers 102 in adoption of risk preferences, in some embodiments, the ranking engine 138 presents peer risk preferences (e.g., either individually or as a combined, typical peer set of risk preferences) within the customer input UI screens, to allow the subscriber 102 to compare its risk profile to peer risk preferences. Further, the ranking engine 138 may determine risk exposure weighting factors for the subscriber's incumbent provider, based upon metric trends derived from historic performance data and survey data, and infer risk preferences based upon these weighting factors, thus supplying a current risk preferences profile to the subscriber 102 based upon the subscriber's selection of the particular incumbent provider 104.

In addition, the ranking engine 138, in some implementations, operates automatically in response to receiving a client risk profile to match a number of providers 104 with the subscriber's current subscription needs and risk exposure preferences. For example, responsive to receiving a risk profile from the subscriber, including a set of risk preferences, the ranking engine 138 may generate a UI screen presenting a set of recommended subscription providers 104. The subscription providers 104 may be illustrated in a ranked order. A similarity factor (e.g., percentage, color code, etc.) may additionally be illustrated to aid the subscriber 102 in differentiating between the subscription providers. Further, in some embodiments, a current risk profile (e.g., based upon weighting factors derived in relation to each recommended provider) may be illustrated along with each of the providers 104. As noted above, the recommendations, if based upon inferred or inherited data, may be flagged to alert the subscriber to the use of "soft" data points in arriving at the particular recommendation. Further, use of inherited or inferred data may cause demotion of a particular provider 104 by the ranking engine 138 when making final recommendations to the subscriber 102.

In some circumstances, the weighting and ranking performed by the ranking engine 138 will result in a set of recommended providers 104 that does not include the incumbent provider 104. In some implementations, the ranking engine 138 will add the incumbent provider 104 to the list of results, for example highlighting one or more reasons for the incumbent provider 104 not being included within the list of recommended providers (e.g., a particular risk factor varies substantially from the subscriber's preferences).

Further, in some implementations, the user interface may include the ability to "drill down" into each recommended provider 104 (and the included but not recommended incumbent provider, if applicable) to review historical performance metrics used by the ranking engine 138 in determining the recommendation. For example, the user may have the option to "click through" for a comparison of performance/survey data of the listed providers 104 and/or individual historic performance metrics (and/or survey result metrics) for a selected provider 104.

Although described in relation to presenting providers 104 using a risk factor-based algorithm, in some implementations, the ranking engine 138 may further present one or more recommended providers 104 based upon the provider's interest in the subscriber's business. For example, when a new provider 104 is added to the environment 100, the ranking engine 138 will lack much of the data used for ranking purposes. Further, when an existing provider 104 expands into a new business area (e.g., new product type or new industry), the level of inference required to fill data points and supply the ranking engine 138 for data useful in making recommendations may be too great to be relied upon. In these circumstances, a provider may be included by the ranking engine 138 based upon other factors (e.g., interest in the business, perceived value to the subscriber, etc.) than risk preference-based matching alone.

The subscriber-provider matching system 108, in some implementations, also includes a dashboard graphical user interface (GUI) engine 140 that controls dissemination and reception of data from the subscribers 102, providers 104, and intermediate participants 106 through one or more user interface (UI) screens that are output to the external devices 158. For example, the subscribers 102 select and/or input risk profile data and risk preferences at a customer risk profile selection UI screen where the subscribers 102 can input a relative importance of one or more carrier attributes with respect to one or more types of risks that can be addressed by services and/or products of the providers 104. The dashboard GUI engine 140 can also output a provider rating screen that identifies one or more of the highest ranking providers 104 associated with a given subscriber 102 with respect to the identified risk profile and preferences. In some implementations, the ERs for the highest-ranking providers 104 are also displayed on the provider rating screen in a format of zero to five stars. In addition, the dashboard GUI engine 140 can output UI screens to the external devices 158 of the subscribers 102 associated with how the providers 104 perform in various segments, regions, and products. A provider rating comparison screen also provides comparative performance results of one or more of the providers 104.

The subscriber-provider matching system 108, in some implementations, also includes a real-time notification engine 148 that ensures that data input to subscriber-provider matching system 108 is processed in real-time. In addition, the processes executed by the real-time notification engine 148 ensure interactions between the participants and the subscriber-provider matching system 108 are processed in real-time. For example, the real-time notification engine 104 outputs alerts and notifications to the providers 104, subscribers 102, intermediate participants 106 via the UI screens when empower rating (ER) are generated by the ranking engine 138, when data associated with the participants have been received by the data mining/collection engine 136.

In some implementations, the real-time notification engine 148 receives a request, through a UI screen, from a subscriber 102 related to interest in pursuing a subscription product with one of the recommended providers 104 and issues a notification to the selected provider 104 to automatically initiate the subscription process. For example, within the UI screen presenting ranked, recommended providers 104, the subscriber 102 may be given the opportunity to elect a particular provider 104 for a new subscription product or renewal of an existing subscription product.

The subscriber-provider matching system 108, in some implementations, also includes an audit engine 162 that tracks how data is gathered and processed in order to provide an analysis of how carrier ratings and rankings are determined. In some implementations, the audit engine 162 can track from when the data is gathered from the data sources by the data mining/collection engine 136 to how the metrics are determined from the data to build the sparse matrix 122 and dense matrix 118 and further to how the data is used to determine the carrier ratings and rankings that are output to the subscribers 102 by monitoring activities within the subscriber-provider matching system 108 and logging audit data 123.

The audit engine 162, in some implementations, builds and outputs audit reports to the subscribers 102, providers 104, and intermediate participants 106 based on queries initiated by one or more of the participants that identify the data, weighting factors, and other information associated with how the carrier rankings and ratings are determined for particular customer risk preferences and risk profiles. For example, an audit may be initiated by one of the participants in the subscriber-provider matching environment 100 to determine why an incumbent provider is not listed as a top-ten ranked provider for a particular subscriber. In some implementations, the audit reports are generated automatically by the audit engine 162 when the ranking engine 138 determines provider ratings and ranking for customer risk preferences. The audit reports may be generated automatically for the subscribers 102 who have input the risk preferences, for the intermediate participants 106 associated with the transactions between the subscribers 102 and the providers 104, and for the one or more top ranked providers 104 as well as for an incumbent provider.

In some implementations, data associated with the processes performed by the subscriber-provider matching system 108 is stored in one or more data repositories of the subscriber-provider matching environment 100. For example, the data repositories can include an auto load data repository 112, a manual load data repository 114, and a process execution data repository 110. Data received by the subscriber-provider matching 108 from the one or more data sources can be received and stored in real-time with respect to when the data is received from the data sources. In addition, the data can be stored automatically in response to receiving one or more data files from the data sources.

The auto load data repository 112 includes data that is automatically updated from one or more sources at predetermined time intervals. For example, auto load data can include billing data 126, market security data 150, legal data 127, claims data 149, and provider data 151. The market security data 150 may include information associated with financial security of providers. The market security data 150, for example, can include regulated insurance company alongside details of rating agency ratings for that company, such as AM Best and S&P. The billing data 126 may include transactional information regarding subscription billing. For example, the billing data 126 can include details of a policy such as details of the subscriber and the provider, alongside product, geographical and financial details. The legal data 127 can include identification of past and current litigation activity involving any of the providers 104 as obtained from public data sources that include published court findings, and other information. The legal data 127, for example, may be used to identify relative litigiousness of the providers 104 or potential threats to the stability of providers 104. The claims data 149 may include claims submitted in relation to subscription products provided to the subscribers 102 by the providers 104, such as insurance claims against subscriber policies. The subscriber-provider matching system 108, for example, can receive operational claims data from a claims processing system that can include data associated with claims processing, such as number of days turnaround for processing a claim or payment versus value sought. The international provider data 151 may data indicative of carrier efficiency in distribution across multiple countries. In one implementation, the billing data 126, the international provider data, and/or the market security data 150 provide real-time indicators of a current state of financial markets and insurance rates.

The subscriber-provider matching system 108 can receive the automatically updated data directly from systems (not shown) associated with producing the various data such as the market security data 150, the billing data 126, the legal data 127, the claims data 148, and/or the international provider data 151. Some systems may be affiliated with the subscriber-provider matching system, such as a claims management system generating the claims data 149. The automatically loaded data can also be updated in real time as market data changes through a day, week, month, or quarter. For example, the data mining/collection engine 136 may receive the real-time updated market security data 150, billing data 126, legal data 127, claims data 148, and international provider data 151, and the data management engine 142 of the subscriber-provider matching system 108 may update the data lake 116 to reflect the current state of the data in the auto load repository 112.

In addition, the manual load data repository 114 includes manually entered information from the participants in the subscriber-provider matching environment 100, such as broker surveys 128, global risk management surveys (GRMSs) 152, subscriber-provider matching system surveys 157, and claims surveys 154. The manually entered information is input via UIs at the external devices 158 and is received by the data mining/collection engine 136 of the subscriber-provider matching system 108. The manually entered information can then be then processed by the data management engine 142 and added to the data lake 116.

For example, broker surveys 128 include information received from the intermediate participants 106 that can include feedback on experiences associated with connecting providers 104 with the subscribers 102. In some implementations, the broker surveys 128 can be received from the brokers periodically, such as twice a year, or once a quarter. The broker surveys 128 can include performance ratings of the providers 104 across various performance metrics.

The GRMSs 152 provide information from the subscribers 102 and participants regarding perceived risks and threats to economic markets, financial instabilities, political threats, and other risks for which the subscribers 102 may be likely to seek products and/or services from the providers 104. For example, the GRMS 152 data may include relative magnitudes of a plurality of perceived threats to the subscribers 102, such as damage to reputation, economic slowdown, regulatory/legislative changes, increasing competition, failures to innovate/meet customer needs, property damage, cyber-attacks, or third-party liabilities. In addition, the GRMSs 152 received from the subscribers 102 can include responses associated with performance of the providers 104 which they do business with across various performance metrics.

The participants of the subscriber-provider matching system 108, in some implementations, are invited to submit survey data relevant to experience using the subscriber-provider matching system 108. For example, intermediate participants 106 and/or subscribers 102 may be asked to submit survey data related to experience with the ranking and recommendation of providers 104 as supported by the ranking engine 138.

In addition, the manual load data repository 114 also includes claims surveys 154 that provide claims service attributes of the providers 104, such as data regarding how claims are processed and paid out. The claims surveys 154 may be initiated by a subscriber 102 and/or provider 104 at the external devices 158 as a feedback mechanism following processing of the claim and can include a level of satisfaction with the claim processing, an amount of time for the claim to be paid out, or type of event that prompted filing of the claim. For example, claims specialists can rate claims performance of insurance companies across various metrics. Other claims service attributes can include willingness to pay, risk engineering, legal support, or loss adjuster services. Additionally, each claims service attribute can be weighted by a predetermined percentage. Further, the providers 104 can be rated on average number of days in which it takes for a claim to get paid and a percentage of claims paid versus claims incurred. In some implementations, the claims surveys 154 can be submitted by the providers 104 and can include a rating associated with ease of customer-carrier interaction, industry segment served, and trends in types of claims processed by the providers 104. The claims surveys 154 may be received at predetermined time intervals, such as once a year, twice a year.

Customer input data 156 is also stored in the manual load repository, which can include risk preferences of the subscribers 102 as well as customer feedback data that represent a level of satisfaction of the subscribers 102 with a claim that settles or a policy that issues. The risk preferences of the subscribers 102 can be input to the subscriber-provider matching system 108 via one or more UI screens that are described further herein. For example, the subscribers 102 can input risk profile data, such as industry, product, region/country, segment, and type of coverage (e.g., primary or excess) as well as preferences associated with the risk profile. For example, the subscribers 102 can indicate a relative importance of each of the preferences at the UI screens, such as cover, financial rating, claims, service, expertise, innovation, market presence, or continuity.

In certain embodiments, the risk preferences of the subscribers 102 can be categorized into financial risk preferences and service risk preferences. For example, the financial risk preferences can include a price and total cost of risk, cover, financial rating, and claims processing of the providers 104. The service risk preferences can include expertise, innovation, market presence, continuity, and overall service experience of the providers 104. In addition, the data management engine 142 can determine average risk preference values for one or more customer peer groups that can be displayed to the subscribers 102 via the UI screens on the external devices 158. For example, the peer groups can include categorical groupings of the subscribers 102 by size, industry type, region, segment, product, or all of the subscribers 102 who participate in the subscriber-provider matching environment 100. The data management engine 142 can determine the average risk preference values for the one or more customer peer groups in real time as the subscribers 102 input the risk preference data to the subscriber-provider matching system 108.

The customer feedback data can include a level of satisfaction of the subscribers 102 with a claim that settles, a policy that issues, or an overall service experience. The customer feedback data can be input to the subscriber-provider matching system 108 via UI screens at the client devices 116 or from surveys submitted from the subscribers 102. Together with the billing data 126 and market security data 150, the customer input data 156 provides an indication of an ability or propensity to pay or financial soundness of the providers 104. In some implementations, the ranking engine 138 can modify weighting factors associated with one or more metrics based on the customer feedback data as well as the risk preference data.

In some implementations, the process execution data repository 110 stores data generated and/or used by the subscriber-provider matching system 100 when matching the subscribers 102 with providers 104 by ranking the providers 104 with respect to customer 102 needs/risks. For example, the process execution data repository 110 can include a data lake 116 that is a compilation of all of the data files received by the data mining/collection engine 136. The data management engine 142 collects the claims survey data 154, GRMS data 152, broker survey data 128, customer input data 156, billing data 126, legal data 127, claims data 149, international provider data 151, and market security data 150 into at least one data file having one or more entries and/or attributes. In addition, the data management engine 142 validates and/or normalizes the data received by the subscriber-provider matching system 100 so that the entries of the data lake 116 are in a predetermined format.

The process execution data repository 110 also includes data structures generated during the execution of a subscriber-provider matching process which include the sparse matrix 122 and the dense matrix 118. For example, the data extraction engine 144 generates the sparse matrix 122 which includes scores, values, and/or weighting factors for each of the providers 104 that indicate connections and interrelationships between the providers 104 and subscribers 102. Additionally, the density logic engine 134 generates the dense matrix 118 by determining values for one or more missing entries of the sparse matrix 118.

The process execution data repository 110 also includes empower rating 124 data structures, which are values assigned to the providers 104 that indicate an amount of compatibility between the subscribers 102 and the providers 104. The ranking engine 138 ranks the providers 104 based on a determined amount of compatibility between the providers 104 and the subscribers 102. The amount of compatibility between the providers 104 and the subscribers 102 can be measured by an empower rating (ER) for each of the providers 104 with respect to each subscriber 102. For example, for a given subscriber 102, the ranking engine assigns a score from zero to five indicating how well the providers 104 meet certain performance, payment, and protection criteria of the subscribers 102. For example, the payment criteria can be an amount of money in the ultimate payout, the speed at which the claim is paid out, and the overall claims service provided by the providers 104.

The process execution data repository 110 also stores ranking templates 120 that are accessed by the dashboard GUI engine 140 to generate one or more UI screens to the external devices 158 to interface with the participants in the subscriber-provider matching environment 100. For example, the dashboard GUI engine 140 can insert the ER results determined by the ranking engine 138 into the ranking templates 120 to allow the subscribers 102 and/or providers 104 to provide inputs to the subscriber-provider matching system 108 as well as view outputs from the system 108. In some implementations, the subscribers 102 can view the ER results in a predetermined format that enables selection of a provider 104 that best meets the risk profile and preferences of the subscriber 102. For example, the ranking templates 120 can include a customer risk profile selection UI screen template where the subscribers 102 can input a relative importance of one or more provider attributes with respect to one or more types of risks that can be addressed by services and/or products of the providers 104. The ranking templates 120 can also include a provider rating screen template that can be configured to identify one or more of the highest ranking providers 104 associated with a given subscriber 102 with respect to the identified risk profile and preferences. In some implementations, the ERs for the highest-ranking providers 104 can also be configured to be displayed within the provider rating screen in a format of zero to five stars. In addition, the ranking templates 120 can also include templates that are configured to display how the providers 104 perform in various segments, regions, and products. A provider rating comparison screen template can also be configured to provide comparative performance results of one or more of the providers 104.

Figure 2:
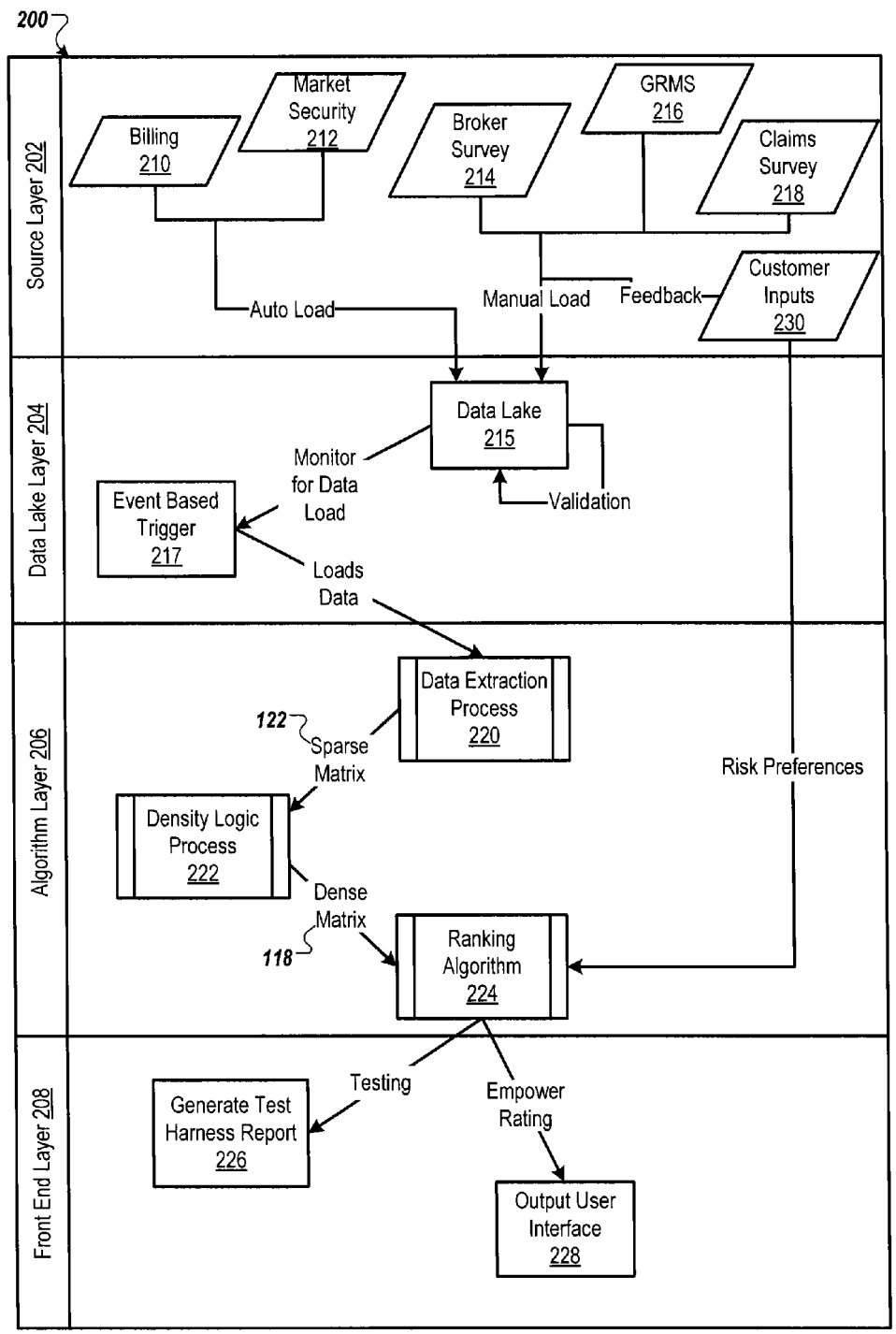
FIG. 2 is a flowchart of a subscriber-provider matching process.

Next, FIG. 2 illustrates a data flow of a subscriber-provider matching process 200. The data flow of the subscriber-provider matching process 200 can be organized into one or more functional layers that can include a data source layer 202, a data lake layer 204, an algorithm layer 206, and a front end layer 208. The processing circuitry of the subscriber-provider matching system 108 of FIG. 1, for example, may execute one or more processes of the functional layers 202, 204, 206, and 208 to receive data from one or more data sources that include risk preferences of the subscribers 102 and attributes of the providers 104, organize the data into a predetermined format, process the data to determine connections between the risk preferences of the subscribers 102 and the attributes of the providers 104, rank the providers 104 based on a strength of the connections between the subscribers 102 and the attributes of the providers 104, and output the ERs for the providers 104 to the external devices 158 of the subscribers 102 and/or providers 104 through one or more UI screens. The processes performed by the subscriber-provider matching process 200 can be executed in real-time in order to provide an immediate response to a system input. In addition, the processes can also be performed automatically in response to a process trigger that can include the reception of data from a data repository, a participant, or another processing engine.

At the data source layer 202, data is received from one or more sources, such as sources connected to the subscriber-provider matching system 108 of FIG. 1, via one or more network interfaces. The subscriber-provider matching process 200, in some embodiments, is able to simultaneously receive and process the data from the one or more data sources so that the ER rankings for the providers can be determined in real-time. In some implementations, the data collection/mining engine 136 of FIG. 1 can receive and process any number of items of data in parallel. In addition, the data can be stored automatically in response to receiving one or more data files from the data sources.

In addition, the data sources can be categorized as auto load data sources or manual load data sources based on how and when the data is received and updated. In one example, the data may be received and updated by the data collection/mining engine 136 of the subscriber-provider matching system 108 of FIG. 1. For example, the auto load data sources can include billing data 210 and market security data 212 that is updated as insurance billing data and market security data change over time. The market security data 212 can include information associated with financial security of providers, and the billing data 210 can include transactional information regarding subscription billing. For example, the billing data 210 can include details of a policy such as details of the insured client and the insurance provider, alongside product, geographical and financial details. The market security data 212 can include regulated insurance company alongside details of rating agency ratings for that company, such as AM Best and S&P.

The manual load data sources can include sources which provide manually entered information from the participants in the subscriber-provider matching flow 200, such as broker surveys 214, global risk management surveys (GRMSs) 216, and claims surveys 214. The manually entered information, for example, may be input via UIs at the external devices 158 and received by the data mining/collection engine 136 of the subscriber-provider matching system 108 of FIG. 1. In addition, the manually loaded data can be input to the subscriber-provider matching process 200 whenever a survey is completed by one of the participants, which may occur at predetermined time intervals such as quarterly, yearly, or may occur on a situational basis.

For example, the broker survey data 214 can include information received from the intermediate participants that can include feedback on experiences associated with connecting providers 104 with the subscribers 102. In some implementations, the broker survey data 214 can be received from the intermediate participants periodically, such as twice a year or once a quarter. The broker survey data 214 can include performance ratings of the providers across various performance metrics.

GRMS data 216 provides information from the subscribers and other participants regarding perceived risks and threats to economic markets, financial instabilities, political threats, and other risks for which the subscribers may be likely to seek products and/or services from the providers. For example, the GRMS 216 data may include relative magnitudes of a plurality of perceived threats to the subscribers, such as damage to reputation, economic slowdown, regulatory/legislative changes, increasing competition, failures to innovate/meet customer needs, property damage, cyber-attacks, and third-party liabilities. In addition, the GRMS data 216 received from the subscribers can include responses associated with performance of the providers which they do business with across various performance metrics.

In addition, the manual load data also includes claims surveys 218 that provide claims service attributes of the providers, such as data regarding how claims are processed and paid out. The claims surveys 218 may be initiated by a subscriber 102 at the external devices 158 of FIG. 1, for example, as a feedback mechanism following processing of the claim and can include a level of satisfaction with the claim processing, an amount of time for the claim to be paid out, type of event that prompted filing of the claim. For example, claims specialists can rate claims performance of providers across various metrics. Other claims service attributes can include willingness to pay, risk engineering, legal support, and/or loss adjuster services. Additionally, each claims service attribute can be weighted by a predetermined percentage. Further, the providers can be rated on average number of days in which it takes for a claim to get paid and a percentage of claims paid versus claims incurred. In some implementations, the claims surveys 218 can be submitted by the providers 104 and can include a rating associated with ease of subscriber-provider interaction, industry segment served, and/or trends in types of claims processed by the providers. In addition, the claims surveys 218 may be received at predetermined time intervals, such as once a year or twice a year.

Customer input data 230 is another example of a manual load data source within the source layer 202, which can include risk preferences of the subscribers as well as customer feedback data that represent a level of satisfaction of the subscribers with a claim that settles or a policy that issues. The risk preferences of the subscribers, for example, can be input to the subscriber-provider matching system 108 of FIG. 1 via one or more UI screens that are described further herein. For example, the subscribers can input risk profile data, such as industry, product, region/country, segment, and type of coverage (e.g., primary or excess) as well as preferences associated with the risk profile. For example, the subscribers can indicate a relative importance of each of the preferences at the UI screens, such as cover, financial rating, claims, service, expertise, innovation, market presence, or continuity. The risk preferences of the subscribers can be inputs to ranking algorithm 224 in the algorithm layer 224, where the risk preferences are used to determine customized weighting factors for one or more metrics associated with determining the ERs for the providers.

The customer input data 230 can include a level of satisfaction of the subscribers 102 with a claim that settles, a policy that issues, or an overall service experience. The customer input data 230 can be input to the subscriber-provider matching system 108 via UI screens at the client devices 116 or from surveys submitted from the subscribers 102. Together with the billing data 210, the customer input data 230 provides an indication of an ability or propensity to pay or financial soundness of the providers 104. In some implementations, the ranking algorithm 224 can modify weighting factors associated with one or more metrics based on the customer input data 230 as well as the risk preference data. The customer input data 230 are input to the data lake 215 along with the other manual load data sources and auto load data sources and are used to determine values for one or more metrics, such as metrics collected in the sparse matrix 122 and dense matrix 118 of FIG. 1.

Next, the data received from the one or more data sources in the data source layer 202 is processed and organized into one or more categorical matrices within the data lake layer 204. For example, the data management engine 142 of FIG. 1 may process the data received by the data mining/collection engine 136 and add the received data to the data lake 215, which is compilation of all of the data received by the data mining/collection engine 136. In addition, the data management engine 142 of FIG. 1 may perform a data validation/normalization process to configure the received data into a predetermined format compatible with a format of the data lake 215. For example, the data management engine 142 may collect the claims survey data 218, GRMS data 216, broker survey data 214, billing data 210, and MARS data 150 into at least one matrix having one or more entries and/or attributes. In addition, the data management engine 142 may validate and/or normalize the data from the source layer 202 so that the entries of the data lake 115 are in a predetermined format.

The data lake layer 204 also includes an event-based trigger detection process 217 that monitors the data lake 215 for data loads. In some implementations, the event-based trigger detection process 217 (such as a process performed by the trigger engine 132 of FIG. 1) continuously scans the entries of the data lake 215 to detect updated data entries. When updated data is detected, the event based trigger detection process 217 may forward the updated data to the algorithm layer 206 so that the updated data can be considered when the empower ratings for the providers are determined. For example, the broker surveys 214 for one or more intermediate participants may be updated on a quarterly basis. When a particular intermediate participant submits the broker survey 216 to the subscriber-provider matching process 200, the event based trigger detection process 217 detects that the data lake 215 entries for the particular intermediate participant have been modified and loads the updated data to the data extraction process 220 in the algorithm layer 206 of the data flow for the subscriber-provider matching process 200. The event based trigger detection process 217 may operate in real-time to update the data extraction process 220 when updated data is received from the data source layer 202. In addition, the event based trigger detection process 217 may operate automatically when updated data is detected in the data lake 215.

In addition, the event-based trigger detection process 217, in some implementations, is configured to detect updates to the data lake 215 from the one or more data sources at multiple update velocities. The update velocity of the data corresponds to a rate or frequency at which the subscriber-provider matching process 200 receives data updates from the data sources, such as the billing data 210, market survey data 212, broker survey data 214, GRMS survey data 216, claims survey data 218, and customer input data 230. In addition, the velocities with which individual participants provide data updates may also vary. For example, a first intermediate participant may provide quarterly broker survey data 214 to the subscriber-provider matching process 200 in March, June, September, and December of a given year while a second intermediate participant may provide bi-annual broker survey data 214 to the subscriber-provider matching process flow 200 in January and July of a given year. Also, the event-based trigger detection process 218, in some embodiments, detects unscheduled updates to the data lake 215. For example, if the second intermediate participant with the January and July scheduled updates submits broker survey data 214 in October, the event based trigger process 217 can detect the data update in real time and determine that the update was unscheduled. The event-based trigger detection process 217, in further embodiments, can detect multiple scheduled and unscheduled updates from multiple data sources in parallel and in real-time.

At the algorithm layer 206, the processing circuitry of the subscriber-provider matching process flow 200 processes the data from the data lake 215 to determine connections between the risk preferences of the subscribers and the attributes of the providers, and then rank the providers based on a strength of the connections between the subscribers and the attributes of the providers. In some implementations, the data extraction engine 144 or FIG. 1 performs the data extraction process 220 where data is extracted from the files of the data lake 116 to generate the sparse matrix 122, which includes data values for one or more metrics associated with each of the providers 104. The data extraction process 220 may operate in real-time to update the sparse matrix 122 of FIG. 1 when updated data is received from the event based trigger process 217. In addition, the data extraction process 220 may operate automatically to process the updated data files received from the event based trigger process 217.

In some implementations, the one or more metrics of the sparse matrix 122 of FIG. 1 are associated with a particular data source. For example, the data extraction process 220 can extract a retention score for the providers from the billing data 210 and a broker rate rating from the broker surveys 214. The resulting sparse matrix 122 may have one or more missing data entries for one or more metrics that represent incomplete data received from the data sources. For example, one or more of the GRMS surveys 216, broker surveys 214, or claims surveys 218 may be partially completed. In addition, the collected survey data may not address one or more of the providers, product types, regions, or segments encompassed by the sparse matrix 122. Details regarding the data extraction process 200 and sparse matrix 122 are discussed further herein.

The algorithmic layer 206 also includes a density logic process 222 that processes the data from the sparse matrix 122 into a dense matrix 118 (as illustrated in FIG. 1). In some implementations, the density logic engine 134 of FIG. 1 performs the functions of the density logic process 222.

The density logic process 222 may determine data values for the missing (null) data entries in the sparse matrix 122. For example, the density logic process 222 can determine the missing data entries by determining an amount of correlation between the missing data entries and filled entries in order to provide simulated values for the missing data entries. The filled entries refer to data entries in the sparse matrix 122 that have been filled with data from the data lake 215. The dense matrix 118 output from the density logic process 222 may include values for all data entries. The density logic process 222 may operate in real-time to update the dense matrix 118 when an updated sparse matrix 122 becomes available from the data extraction process 220. In addition, the density logic process 222 may operate automatically to process the updated sparse matrix 122.

The dense matrix 118 output from the density logic process 222 is an input to a ranking algorithm process 224, which determines the empower ratings (ER) for the providers and ranks the providers based on the risk needs and/or preferences of the subscribers. The ranking algorithm process 224, for example, may be performed by the ranking engine 138 as described in relation to FIG. 1. Using the dense matrix 118, the ranking algorithm process 224 ranks the providers based on a determined amount of compatibility between the providers and the subscribers. The amount of compatibility (e.g., the ER) between the providers and the subscribers can be measured for each of the providers with respect to each subscriber.

For example, for a given subscriber, the ranking algorithm process 224 may assign a score from zero to five indicating how well the providers 104 meet certain performance, payment, and protection criteria of the subscribers. For example, the payment criteria can an amount of money in the ultimate payout, the speed at which the claim is paid out, and the overall claims service provided by the providers. The ranking algorithm process 224 can determine the ERs for the providers based on needs, risk preferences, and/or priorities of the subscribers that are input at the external devices 158 via one or more user interface screens, as illustrated in FIG. 1, as well as weighting factors associated with each of the metrics of the dense matrix 118. The ranking algorithm process 224 may adaptively and predictively update the weighting factors for each of the metrics based on learned trends in the market security data 212, billing data 210, and other data sources as well as the risk preferences of the subscribers. The ranking algorithm process 224 may operate in real-time to determine rankings for the providers in response to receiving needs or risk preferences input from the subscribers via customer input UI screens. In addition, the ranking algorithm process 224 may operate automatically in response to receiving a client risk profile.

The subscriber-provider matching process flow 200 also includes the front end layer 208, which includes one or more sub-processes associated with outputting and/or displaying the ERs of the providers for the benefit of the subscribers. The ERs, for example, may be displayed for the subscribers at one or more external devices 158 via one or more UI screens, as shown in FIG. 1. For example, the UI screens may be output (228) to the external devices 158 of the participants in the subscriber-provider matching environment 100 via the dashboard GUI engine 140 that controls dissemination and reception of data from the subscribers 102, providers 104, and intermediate participants 106 through one or more user interface (UI) screens that are output to the external devices 158. For example, the subscribers select and/or input risk profile data and risk preferences at a customer risk profile selection UI screen where the subscribers can input a relative importance of one or more provider attributes with respect to one or more types of risks that can be addressed by services and/or products of the providers. The dashboard GUI engine 140, for example, may output a carrier rating screen that identifies one or more of the highest ranking providers 104 associated with a given subscriber 102 with respect to the identified risk profile and preferences. In some implementations, the ERs for the highest-ranking providers are displayed on the provider rating screen in a format of zero to five stars. In addition, the dashboard GUI engine 140 can output UI screens to the client devices 116 of the providers 104 associated with how the providers 104 perform in various segments, regions, and products. A provider rating comparison screen also provides comparative performance results of one or more of the providers. Details regarding the UI screens are discussed further herein.

The subscriber-provider process flow 200, in some implementations, also includes the feature of generating test harness reports (226). The processing circuitry of the subscriber-provider matching system 108 of FIG. 1, for example, can also output a test harness report (226) to external devices 158 of one or more backend system managers who monitor the execution of the processes by the subscriber-provider matching system 108 to detect unexpected errors in the execution of the subscriber-provider matching process flow 200. Details regarding the test harness report are discussed further herein.

Figure 3:
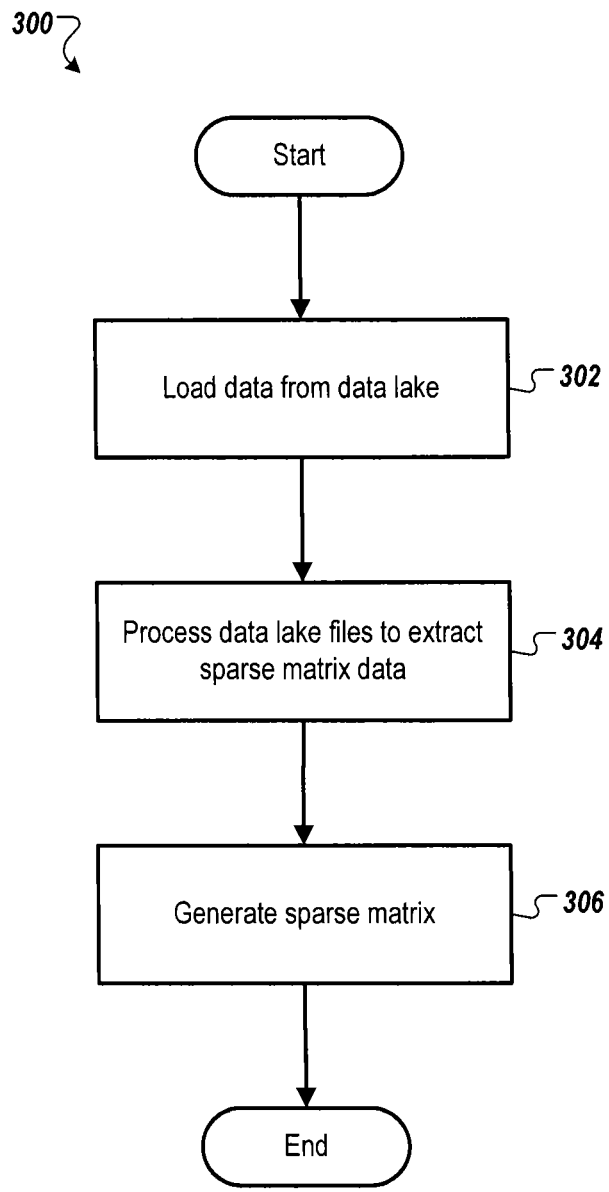
FIG. 3 is a flowchart of a method for preparing data for use in a subscriber-provider matching system.

Next, FIG. 3 is a flowchart 300 illustrating an exemplary method for generating the sparse matrix 122 representing data lake information based on predetermined metrics, which is one implementation of the data extraction process 220. The data extraction process 220 may operate in real-time to update the sparse matrix 122 when updated data is received from the event based trigger process 217. In addition, the data extraction process 220 may operate automatically to process the updated data files received from the event based trigger process 217.

At step 302, data is loaded from the data lake. The data extraction engine 144 of FIG. 1, for example, may receive the data from the data lake 116 via the data management engine 142. The data management engine 142 may organize the manually loaded and auto loaded data received by the subscriber-provider matching system 108 and also control data handling during execution of the processes associated with determining customized ratings of the providers 104 for the subscribers 102 based on predetermined criteria. In some implementations, the data management engine 142 processes the data received by the data mining/collection engine 136 and loads the received data to the data lake 116. In addition, the data management engine 142 may perform a data validation/normalization process to configure the received data into a predetermined format compatible with a format of the data lake 116. The data management engine 142 may continually update the data lake 116 as updated data is received by the subscriber-provider matching system 108.

At step 304, the data lake files are processed to extract sparse matrix data. For example, the data files from the data lake 116 of FIG. 1 may be processed to extract data values to insert into the sparse matrix 122. The data extraction engine 144 may process the billing data 126, market security data 150, legal data 127, claims data 149, international provider data 151, broker survey data 128, GRMS data 152, subscriber-provider matching system survey data 157, and claims survey data 154 to identify data values for each of the metrics for each of the providers 104 of the sparse matrix 122. The predetermined metrics used to construct the sparse matrix 122 may be categorized into one or more categories that include price, payment, protection, pricing, process, product, proficiency, promotion, and performance metrics. For example, the predetermined metrics for protection may include a financial rating, type of coverage, and/or market segment. The financial rating may represent an aggregated global/local composite rating agency score premium weighted for each entity (provider). The data may be obtained from a rating agency (e.g., S+P, Moody's, etc.). The data level for the financial rating metric, for example, may be global based on each entity. The predetermined metrics for payment may include commitments and offerings, and/or speed with which claims are processed and paid out to the subscribers. The predetermined metrics for process may include accreditation information of the providers, an innovation rating, and investment in systems. The predetermined metrics for pricing can include appetite strength, competitiveness, cross sale strength, and value. The predetermined metrics for performance may include premium, cover, rate, expertise, service, and capabilities of the providers. The predetermined metrics may further include a continuity metric and a premium volatility metric.

The commitment metrics may be based on signed claims escalation agreements for the subscribers and signed enhanced claims commitments for the subscribers. The data source for the commitments metrics may be the claims surveys data 154 received from external devices 158 of the subscribers 102 and/or providers 104, as shown in FIG. 1. The offerings metrics may be based on biannual GRMS data 152 which can include customer responses to customer questions, or broker survey data 128 that includes responses to claims questions, or claims professional survey responses to claims question, and/or resolution of provider-specific contentious claims for the subscribers 102. The premium metrics may be based on a provider premium level reflecting an entity broking power on behalf of clients, a provider premium distribution with the entity reflecting local market standing, a provider local market standing by region/segment/product combination, a customer appeal based on provider premium trending in relevant sector, a retention on an entity customer based on a combination of region, segment, and/or product, and a quote to bind ratio on the entity customer portfolio by the combination of region, segment.

The cover metrics may be based on the entity GRMS client responses to provider cover questions and on the entity intermediate participant survey responses to provider cover question. The rate metrics can be based on the entity GRMS client responses to carrier pricing questions and on the entity intermediate participant survey responses to provider pricing questions. The expertise metrics can be based on the entity GRMS client responses to provider expertise questions and on the entity intermediate participant survey responses to carrier expertise questions. The service metrics can be based on the entity GRMS client responses to provider service questions and on the entity intermediate participant survey responses to provider service questions. The capability metric may be based on proven provider innovation, data, and analytics standalone and with the entity.

At step 306, the sparse matrix is generated. For example, the data extraction engine 144 of FIG. 1 may generate the sparse matrix 122 from the data values of the data lake 116. The sparse matrix 122 may include, for each of the providers 104, values for each of the metrics described herein. For example, a retention metric can be calculated from the billing data 126 by dividing a sum of a provider's renewed premium within the past twelve months by a sum of premium renewable for that provider from the previous twelve month period, for a given geography, product, or client segment. The values may be normalized, averaged, and/or scaled. The sparse matrix 122 may also include values for each of the metrics for all possible combinations of product, country, segment, and region.

The resulting sparse matrix may have one or more missing data entries for one or more metrics that represent incomplete data received from the data sources. For example, one or more of the GRMS surveys 152, broker surveys 128, or claims surveys 154 (shown in FIG. 1) may be partially completed. In addition, the collected survey data may not address one or more of the providers 104, insurance types, regions, or segments encompassed by the sparse matrix 122.

The data may be updated on a monthly basis, quarterly basis, or other suitable period. The weighting may also be affected by velocity which takes into account the update rate of each of the metrics. For example, the commitment metric may be updated quarterly, the GRMS data 216 may updated biannually, and the broker survey data 214 may be updated annually. In other examples, the update rate of certain metrics may be much more frequent, such as weekly, daily, or twice-daily updates. For example, risk information associated with claims data 149, current events or natural disasters may be fed into the subscriber-provider process flow 200 on a very frequent basis (e.g., weekly, daily, every N hours, etc.). Further, some information may be updated in unanticipated and random bursts, such as legal data 127. The weighting may also affected by data-level such as global, region-product, region-segment, region-segment-product, and a varying level.

Figure 4:
FIG. 4 is a diagram of an exemplary sparse matrix.

FIG. 4 shows exemplary sparse matrix data generated using the methodology shown in FIG. 3 (e.g., using the data lake 116). Table 400 may be a partial representation of the sparse matrix 122 of FIG. 1 that includes a large amount of data. The sparse matrix 122 may include one or more categories 402 that can be used to classify the data from the data lake 116. For example, the categories 402 can include carrier, country, product, segment, region, insurer, etc. In some implementations, a total number of rows of the sparse matrix 122 equals a total number of possible combinations of the categories 402. For each combination of the categories 402, the sparse matrix 122 includes one or more metrics 404 that describe one or more attributes of the providers 104 and combinations of categories 402. In addition, each metric 404 of the sparse matrix 122 can indicate a data source associated with each metric, which can include any of the auto load sources or manual load sources described previously. In one example, a first metric in table 400 represents provider premium distribution with the entity reflecting local market standing. A second metric represents the financial rating. A third metric represents the client appeal based on provider premium trending in relevant sector. A fourth metric represents the retention on the entity client based by region/segment/product combination. Each of the metrics 404 may be calculated for all possible combinations of product, country, segment, and region. In addition, the sparse matrix 122 may have missing data entries for one or more of the metrics 404 associated with one or more carriers. For example, Carrier 1 has a missing data entry for Metric 3, and Carrier 5 has missing data entries for Metric 2, Metric 3, and Metric 4. In addition, in some embodiments, a total number of columns of the sparse matrix is equal to a sum of the number of categories 402 and the total number of metrics 404.

Figure 5:
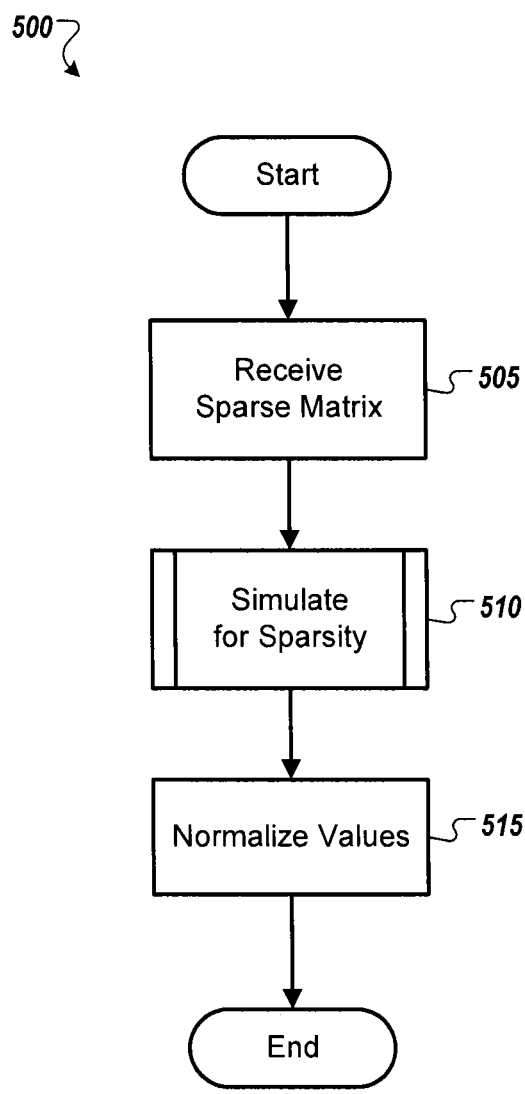
FIG. 5 is a flowchart of method for constructing a dense data matrix for use in a subscriber-provider matching system.

Next, FIG. 5 illustrates a flow chart of an exemplary process 500 for constructing a dense matrix. For example, the process 500 may be used to construct the dense matrix 118 of FIGS. 1 and 2, using the density logic process 222 and/or the density logic engine 134.

The process 500 determines data values for the missing (null) data entries in a sparse matrix, such as sparse matrix 122. For example, the density logic engine 134 can determine the missing data entries by determining an amount of correlation between the missing data entries and filled entries received from alternate data sources in order to provide simulated values for the missing data entries. The filled entries refer to data entries in the sparse matrix 122 that have been filled with data from the data lake 116. The dense matrix 118 output from the density logic engine 134 includes values for all data entries. In addition, the density logic engine 134 may flag the data entries of the dense matrix 118 that have been fully or partially inherited or inferred so that the provider ratings and recommendations made to the subscribers 102 on data that has an amount of inferred/inherited data elements can be identified to the subscriber 102 accordingly. In one example, a recommendation is identified as being based upon inferred/inherited data if the amount of inferred/inherited data used in determining the rank of the recommended provider is greater than a predetermined threshold. The density logic process 222 may operate in real-time to update the dense matrix when an updated sparse matrix 122 from the data extraction process 220. In addition, the density logic process 222 may operate automatically to process the updated sparse matrix 122.

At step 505, the sparse matrix is received. The sparse matrix 122, for example, may be received from the data extraction engine 144, as described in relation to FIG. 1. The sparse matrix 122 can include values for the metrics for each of the providers 104. At step 510, a sparsity simulation process can be performed with various simulation methods executed based on the inputs from the sparse matrix 122. In some implementations, the dense matrix 118 is constructed by determining simulated values for missing data entries from the sparse matrix 122. When the data sources files have missing or conflicting data that is included in the sparse matrix 122, such as broker survey data 128, GRMS data 152, and claims survey data 154, the density logic engine 134 of FIG. 1 can determine mapped data values for the missing data by performing data simulations with the data received from alternate data sources. For example, the process execution data repository 110 can include a mapping dictionary that includes predetermined mapping rules used by the density logic engine 134 to determine simulated values for the missing data in the sparse matrix 122. Details regarding the simulation for sparsity are discussed further in relation to FIGS. 6A and 6B.

Figure 11:
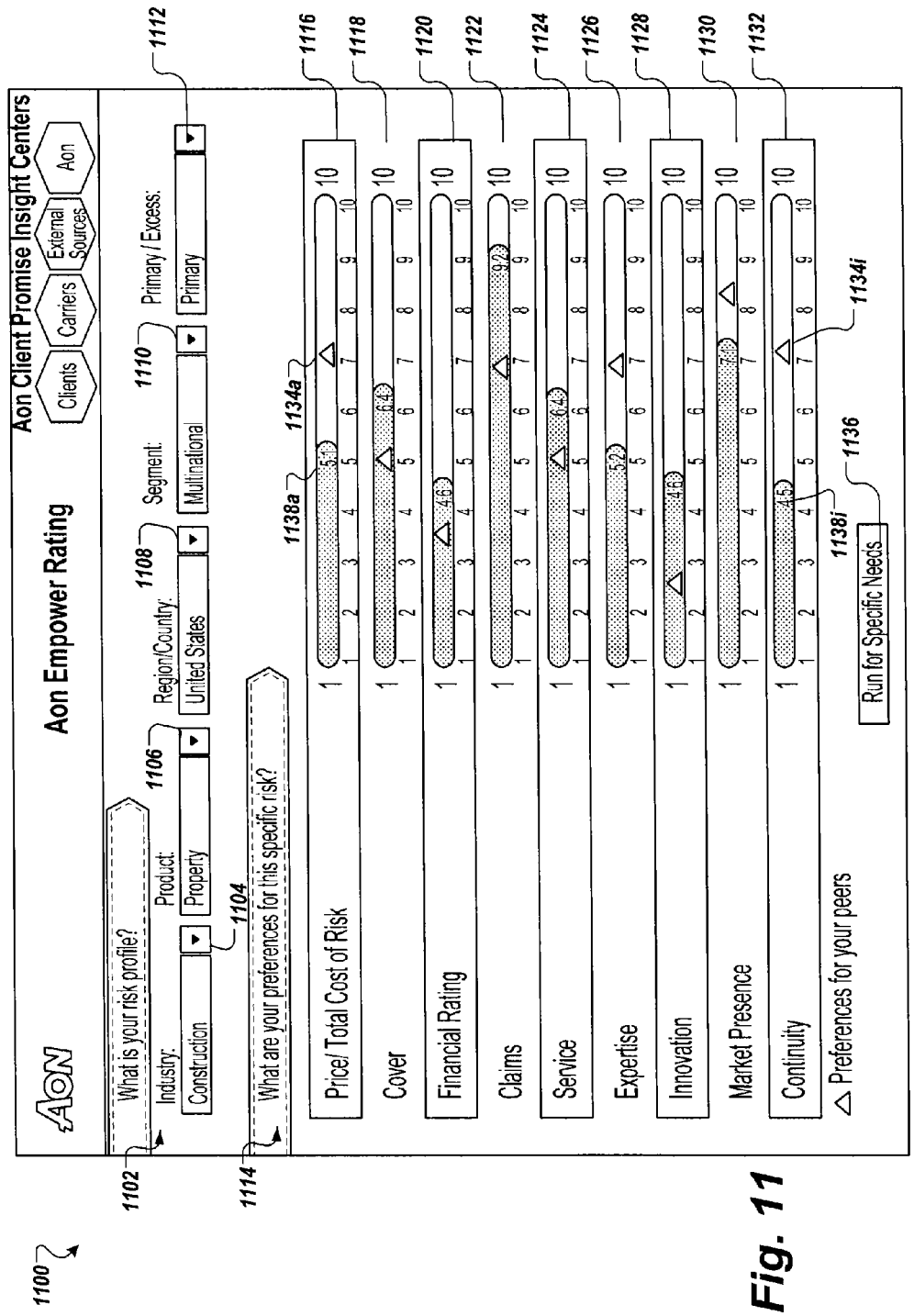

At step 515, data values are normalized. For example, the density logic engine 134 may normalize the data values for the metrics to fit a 1-10 scale to better enable the sliders on the customer input UI screen, as illustrated in FIG. 11, to operate with greater sensitivity. The data values can be determined based on the results from the simulation of the sparsity in step 510. Additionally, the dense matrix 118, constructed from the input of the sparse matrix 122 and the simulation for sparsity at step 505, can be configured into a predetermined format compatible with the process associated with the ranking algorithm 224.

Figure 6A:
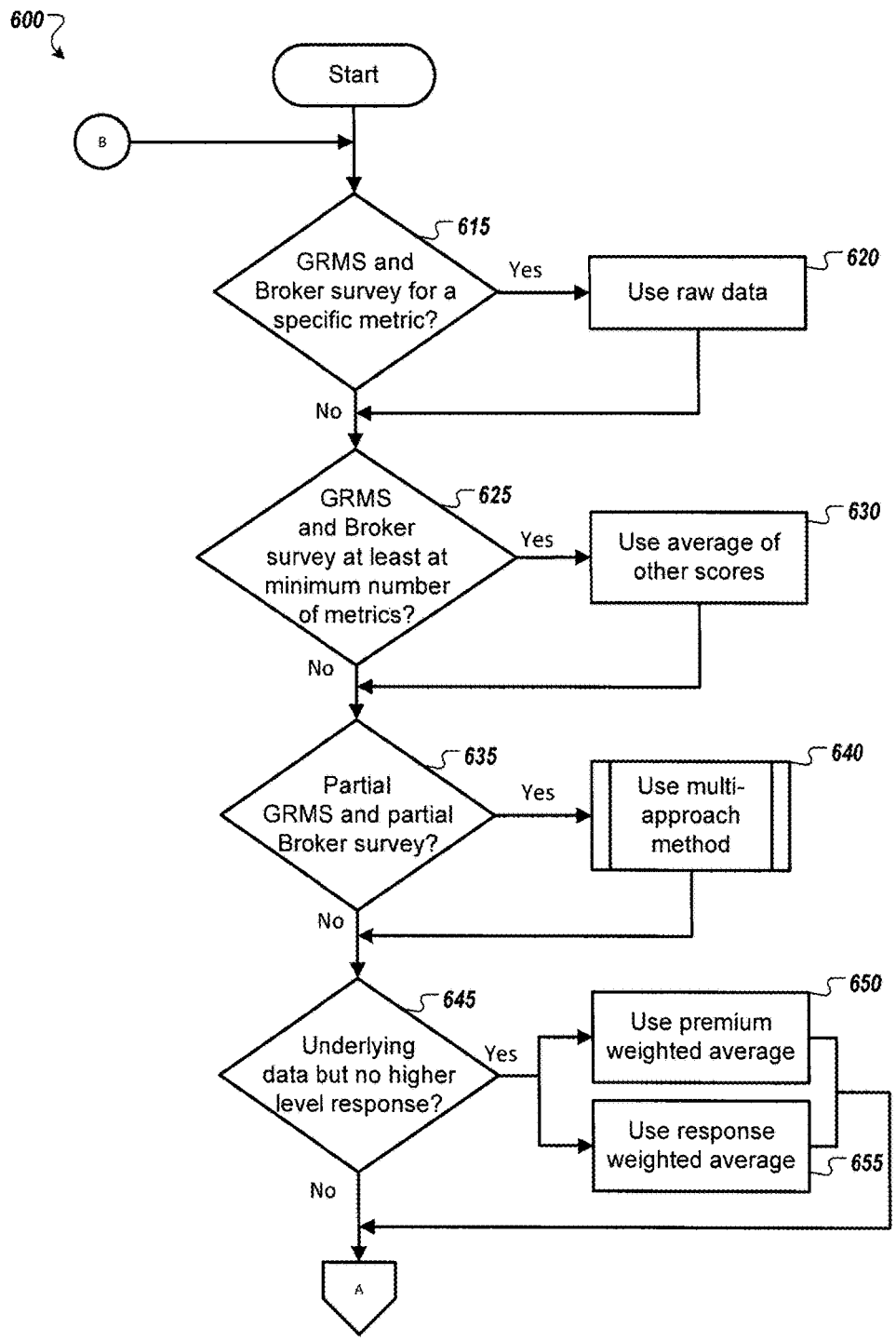
FIGS. 6A and 6B are flowcharts of a method for simulating sparsity in a dense matrix.
Figure 6B:
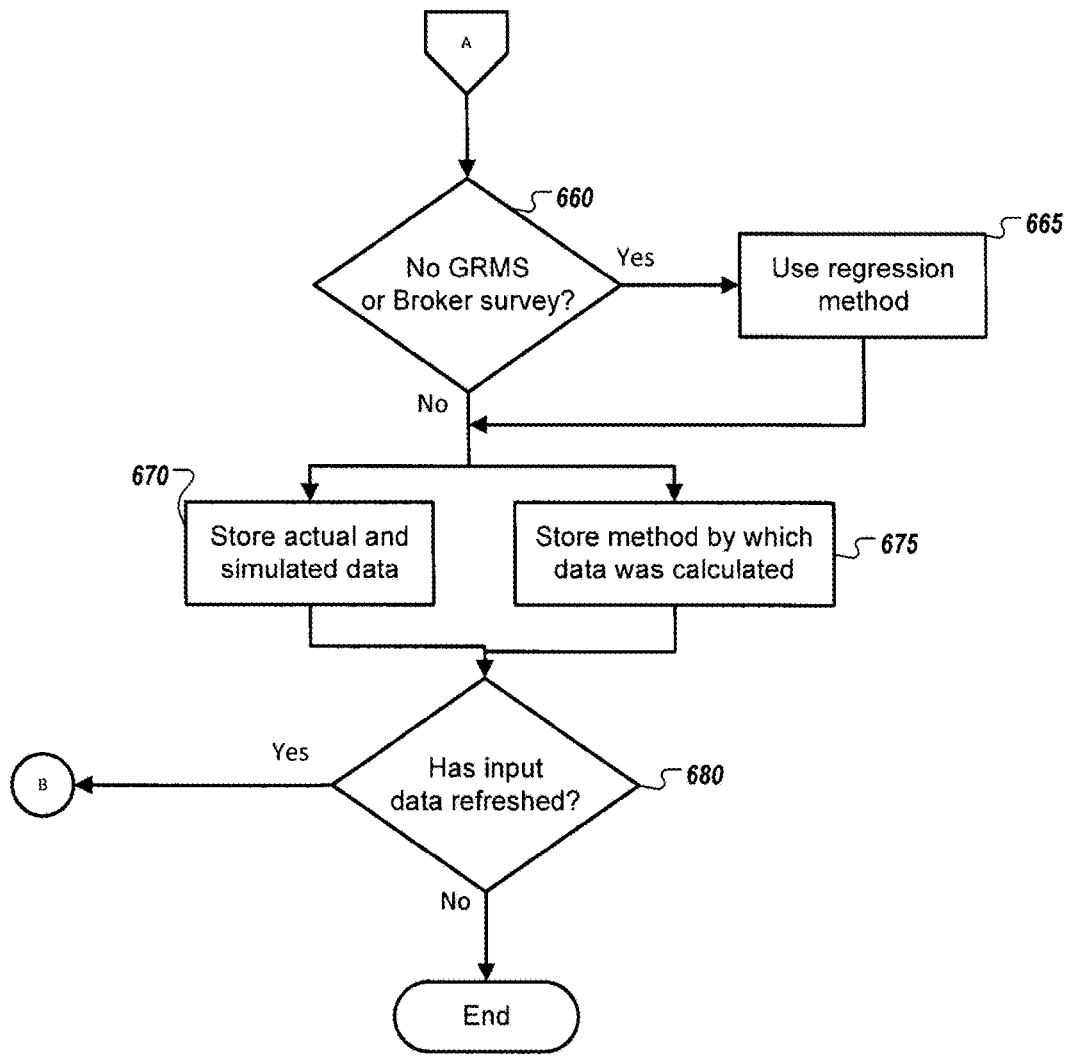

Next, FIGS. 6A and 6B illustrate a flowchart of an exemplary algorithmic process 600 of simulating for sparsity. The process 600, for example, may be used in step 510 of the flowchart 500. The sparsity simulation is described herein with respect to the GRMS data 152 and the broker survey data 128 of FIG. 1, but can also be applied to data in the sparse matrix that is derived from any other data source, such as the claims survey data 154 and/or any of the auto load data.

At step 615, it can be determined if the GRMS data 152 and the broker survey data 128 are accessible for a specific metric within the sparse matrix 122. In some implementations, the density logic engine 134 groups the data of the sparse matrix 122 into specific carrier-product-sub-region-segment groupings. Other categorical groupings can also be determined. For example, higher level groupings can encompass larger amounts of data from fewer categories, such as a carrier-segment grouping. If the GRMS data 152 and the broker survey data 128 are available for a particular metric within a particular grouping that is being evaluated, then raw data from the sparse matrix 122 can be used (620) to determine the dense matrix 118 data values for the grouping. However, if either the GRMS data 152 or the broker survey data 128 are not accessible, then the process 600 moves to step 625 to determine whether the GRMS data 152 and the broker survey data 128 include responses for at least a minimum number of metrics that are represented as data entries within the sparse matrix 122. At step 620, the raw data from the sparse matrix 122 can be applied to the dense matrix 118, and no sparsity simulation may be necessary.

At step 625, it can be determined whether the GRMS data 152 and the broker survey data 128 include responses for at least a minimum number of metrics within a particular categorical grouping, such as carrier-product-region-segment groupings when either the GRMS data 152 or the broker survey data 128 are not accessible. Other examples of categorical groupings include carrier-product, carrier-region, carrier-segment, and any other combination of categories within the sparse matrix 122 and dense matrix 118. For example, a minimum number of metrics may be set to a survey response across 5 of 6 metrics. Therefore, a survey response across 4 of 6 metrics would not meet the minimum qualification. If the GRMS data 152 and the broker survey data 128 include responses that do meet the predetermined minimum number of metrics, then an average method can be used at step 630. However, if the GRMS data 152 and the broker survey data 128 include responses that do not meet the predetermined minimum number of metrics, then the process can continue to step 635.

At step 630, an averaging method can simulate the one or more missing metrics within the categorical groupings as an average of the other scores from the survey responses of the available metrics. The process can then continue to step 635.

At step 635, the density logic engine 134 determines whether the sparse matrix 122 includes data from a partial GRMS 152 and/or a partial broker survey 128. If the sparse matrix 122 includes data representing either a partial GRMS 152 and/or a partial broker survey 128, a multi-approach method can be used at step 640 to determine the missing data values from the surveys. However, if the sparse matrix 122 does not include partial GRMS data 152 or partial broker survey data 128, then the process can continue to step 645.

At step 640, a multi-approach method is performed where one or more simulation tests are performed, and a simulation score can be calculated that is a measure of a confidence in the simulated values, which is referred to as a correlation factor, and the results of the simulation test with the highest correlation factor can be selected as the simulation values that are incorporated into the dense matrix 118, and the process continues to step 645. Details regarding the multi-approach method are further described in FIG. 7.

At step 645, the density logic engine 134 determines whether lower level data exists for a higher-level grouping that has missing data. For example, a particular country-provider grouping may be not have associated GRMS data 152 or broker survey data 128 but data cells within the sparse matrix 122 representing the country and provider categories have associated GRMS data 152 or broker survey data 128. If the lower-level data values are filled but the higher level data groupings are null, then a premium weighted average can be used at step 650 and/or a response weighted average can be used in step 655. It should be appreciated that the premium weighted average and the response weighted average can be used independently or in combination. However, if there are no lower-level data values then the process can continue to step 660.

At step 650, the premium weighted average is applied, which is one way of consolidating low-level data, such as carrier-segment-product-country categorical groupings, into higher level data, such as for a carrier across all combinations of categorical groupings. The premium weighted average may be calculated by giving premiums with higher scores a higher weight than scores with lower scores. For example, if the US includes half of the premium and scores a 10 for a given metric and the UK is a quarter of the premium and scores a 5, and France is a quarter of the premium and scores a 5, then the premium is calculated as follows: (10*0.5)+(5*0.25)+(5*0.25)=7.5

At step 655, the response weighted average is applied, which is another way of consolidating the low-level data into higher-level data. The response weighted average may be calculated by giving combinations with more respondents a higher weight than scores with a lower number of respondents. For example, if the US has 5 respondents and scores 10, UK has 5 respondents and scores 5, and France has 10 respondents and scores 5, then the response weighted average can be calculated as [(10*5)+(5*5)+(5*10)]/(5+5+10)= 6.25.

Turning to FIG. 6B, at step 660, it can be determined if there is any data missing from the sparse matrix 122 that is associated with the GRMS data 152 or broker survey data 128. If there is no GRMS data 152 or broker survey data 128 for any metric for a particular provider or categorized grouping, a regression method can be used in step 665. However, if the GRMS data 152 or the broker survey data 128 exist for the provider or categorized grouping, then the process can continue to steps 670 and 675.

At step 665, the regression method can use raw and/or simulated data to determine a relationship between retention, growth, market share, and like. The result of the relationships determined by the regression method can be used to estimate the broker survey 152 and GRMS data 128 as well as patterns across the intermediate participant survey questions based on a broad data-set. The process can then continue to steps 670 and 675 where the actual and simulated data of the dense matrix 118 (670) and method by which the data was calculated for each of the values in the dense matrix 118 (675) are stored in the process execution data repository 110 independently or in combination. For example, for a combination where there was neither broker survey data 152 nor GRMS data 128 for a particular provider grouping, the stored method for determining the missing data values is "estimated by regression."

At step 680, it can be determined if input data from the data extraction engine 144 has been refreshed. For example, when the Broker Survey, GRMS, etc., are updated such that there is a new survey or the survey has changed, the input data can be refreshed. If the input data has been refreshed, the process can return to step 615 to receive the sparse matrix 122 from the data extraction engine 144. However, if the input data has not been refreshed, then the process is terminated.

Figure 7:
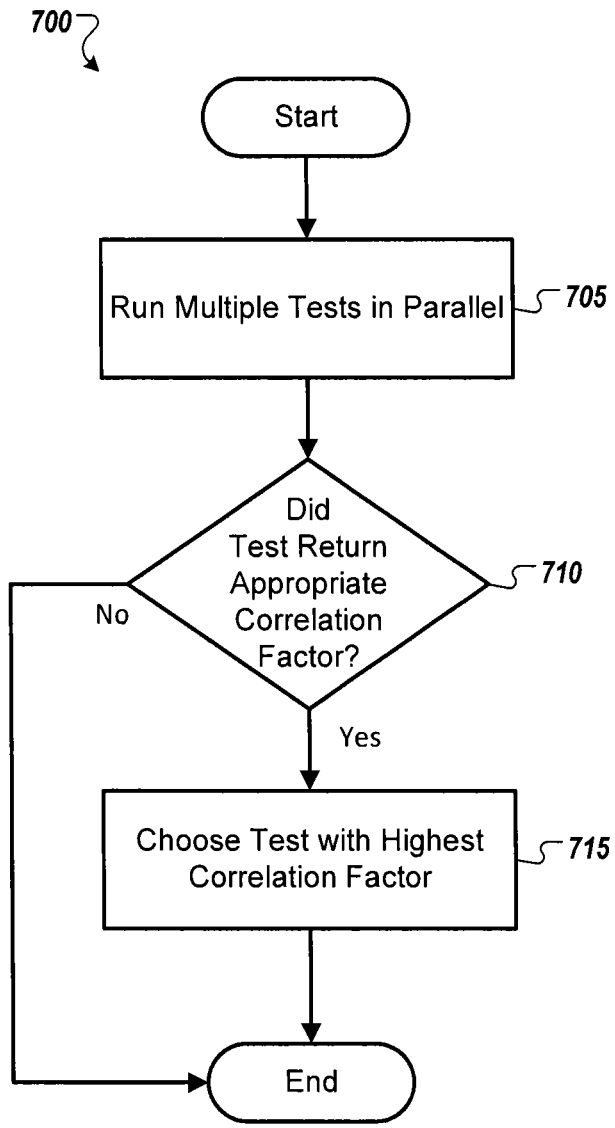
FIG. 7 is a flowchart of a method for evaluating simulation tests performed against a dense data matrix.

Next, FIG. 7 illustrates a flowchart of an exemplary process 700 for evaluating simulation test results. The process 700, for example, can be used when performing the multi-approach method of step 640 of the process 600, described in relation to FIGS. 6A and 6B, to determine the simulation test with the highest correlation factor according to one aspect of the present disclosure. In some implementations, the multi-approach method of step 640 includes the performance of one or more simulation tests. A simulation score can be calculated that is a measure of a confidence in the simulated data values, which is referred to as a correlation factor, and the results of the simulation test with the highest correlation factor can be selected as the simulation values that are incorporated into the dense matrix 118.

At step 705, a plurality of simulation tests may be run in parallel. Using small datasets, all calculations can be run to determine the best test. The calculations can include various statistical analyses, such as a Kruskal test, in order to calculate correlation factors that are used as a metric for determining which technique results in a best estimate of the simulation. In one implementation, at a deepest data-layer, the plurality of simulation tests can include taking the broker survey data 128 results associated with one or more particular categorized groupings, in order to infer the GRMS data 152 having the same or higher-level categorical groupings as the broker survey simulation tests. In some embodiments, the simulation tests can be executed by the density logic engine 134 of FIG. 1 in parallel.

At step 710, it can be determined if the test returned an acceptable correlation factor. In some implementations, the correlation factors have a range of 0 to 1 and relate to a probability of occurrence of particular values within the dense matrix 118. For example, correlation factors greater than 0.05 may be determined to be acceptable, which corresponds to a greater than 95% confidence in the estimation technique. If the correlation factor is not acceptable, no simulation will occur, and the process is terminated. However, if the correlation factor is an appropriate value, then the test with the highest correlation factor can be selected at step 715 to be included in the dense matrix 118 calculations.

FIG. 8 is a diagram of an exemplary dense matrix 118. The dense matrix 118 has dimensions (number of columns and rows) that correspond to the dimensions of the sparse matrix 122. Table 800 is a partial representation of the dense matrix 118 that includes a large amount of data. The dense matrix 118 includes one or more categories 802 that, for instance, can be used to classify the data from the data lake 116. In some examples, the categories 802 can include provider, country, product, segment, region, insurer, etc. In some implementations, a total number of rows of the dense matrix 118 is equal to a total number of combinations of the categories 802. For each combination of the categories 802, for example, the dense matrix 118 includes one or more metrics 804 that describe one or more attributes of the providers 104 and combinations of categories 802. In one example, a first metric in table 800 represents provider premium distribution with the entity reflecting local market standing. A second metric represents the financial rating. A third metric represents the client appeal based on provider premium trending in relevant sector. A fourth metric represents the retention on the entity client based by region/ segment/product combination. Each of the metrics 804 may be calculated for all possible combinations of categories 802 (product, country, segment, and region). In addition, a total number of columns of the dense matrix 118 may be equal to a sum of the number of categories 802 and the number of metrics 804.

Data values in the Table 800 that are in parentheses indicate data values that were missing in the sparse matrix 122 but have been inferred or inherited (estimated or simulated) by the processes described previously. In some implementations, the dense matrix 118 includes indication of all metric values inferred or inherited rather than calculated.

Figure 9A:
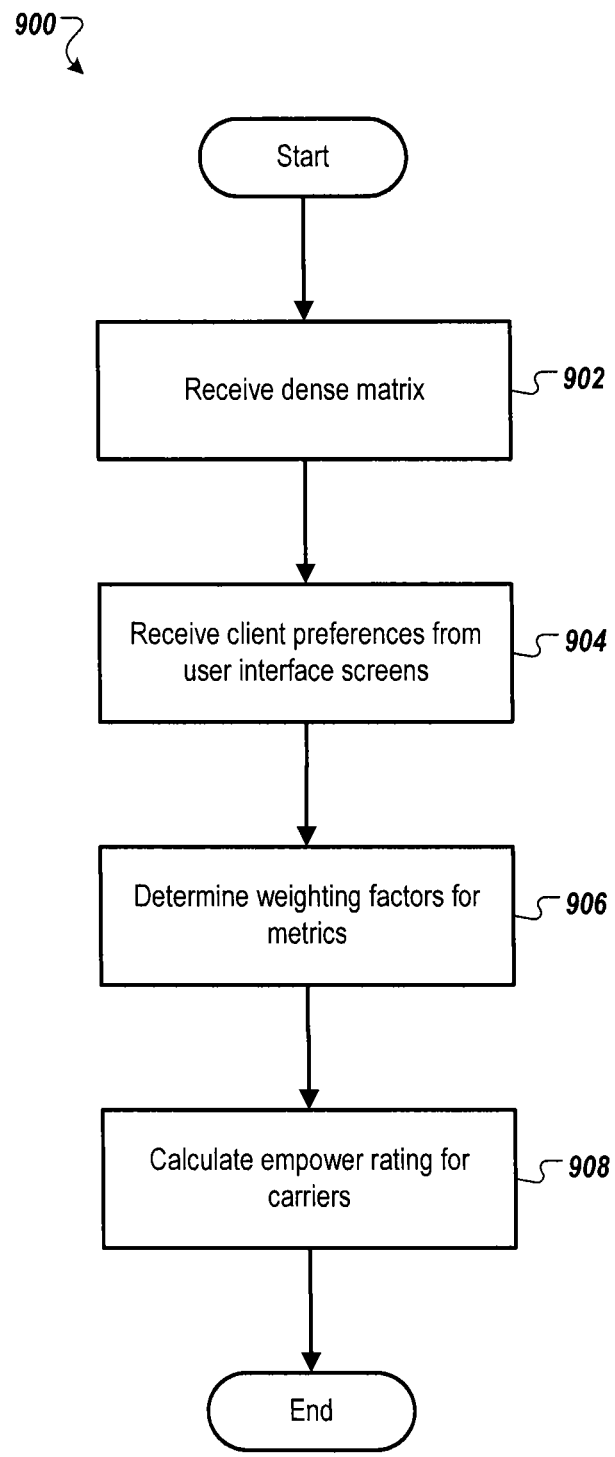
FIG. 9A is a flowchart of a method for matching subscription providers to a subscriber based upon user preferences.

FIG. 9A is a flowchart of a method 900 for determining rankings for providers based on needs and/or risk preferences of subscribers, which is one implementation of the ranking algorithm 224 described in relation to FIG. 2. The ranking algorithm 900 may operate in real-time to determine rankings for the providers in response to receiving needs or risk preferences input from the subscribers via customer input UI screens, such as the external devices 158 illustrated in FIG. 1. In addition, the ranking algorithm 900 may operate automatically in response to receiving a client risk profile. For example, a subscriber 102 may select "United States" and "manufacturing" as preferences at a user input interface screen. The ranking engine 138 can apply weighting factors to the metrics for providers 104 that handle manufacturing facilities based in the United States and then output ERs and rankings for the providers 104. This information can be used by the ranking engine 138, for example, in determining a confidence associated with recommendations presented to the subscribers 102, as described in relation to FIG. 1 and elsewhere herein.

At step 902, a dense matrix is received. The ranking engine 138 of FIG. 1, for example, may receive the dense matrix 118 as an input from the density logic engine 134 and/or process execution data repository 110.

At step 904, client preferences are received. The client preferences, for example, may be submitted by subscribers via user interface screens. For example, the subscriber-provider matching system 108 may receive needs and/or risk preferences of the subscribers 102 via one or more UI screens. For example, the subscribers 102 can input and/or select a relative importance of one or more provider attributes with respect to one or more types of risks that can be addressed by services and/or products of the providers 104. The metrics, in some examples, can include industries, products, regions, segments, and type of coverage (e.g. primary, excess). An exemplary user interface for receiving customer needs and/or risk preferences is described further herein with respect to FIG. 11. Each of the inputs by the subscribers 102 at the customer UI screens can be translated into a corresponding customer input factor for each of the metrics of the dense matrix 118.

At step 906, weighting factors are determined for each of the metrics of the dense matrix 118 that reflect a relative importance of metrics with respect to determining provider ratings that reflect risk preferences of the subscribers 102. Further, in some embodiments, the weighting factors may reflect overall trends in financial and insurance markets or trends significant to particular characteristics associated with the requesting subscriber, the product requested, and/or other subscription request factors (e.g., geographic region, industry, etc.). As such, multiple sets of weighting factors may be determined, where each set of weighting factors is applicable to a particular requesting subscriber's characteristics and/or the subscription desired by the requesting subscriber. In some implementations, the weighting factors are stored in the process execution data repository 118, which can be accessed by the ranking engine 138. The weighting factors may be represented by one or more weight categories that can include customer needs, data source, data-level, and velocity. For example, the velocity corresponds to a rate at which the data sources for the metrics are updated, such as monthly, quarterly, bi-annually, annually, or multi-year updates. Velocity may further correspond to rates of actual receipt of data received (e.g., on both the scheduled and unscheduled basis, as described herein). Each set of weighting factors may include multiple attributes. For example, the weighting factor attributes may be represented individually by data source. The source attributes may include, but are not limited to, the billing data 210, market security data 212, broker survey data 214, GRMS data 216, claims survey data 218, and customer input data 230.

Figure 9B:
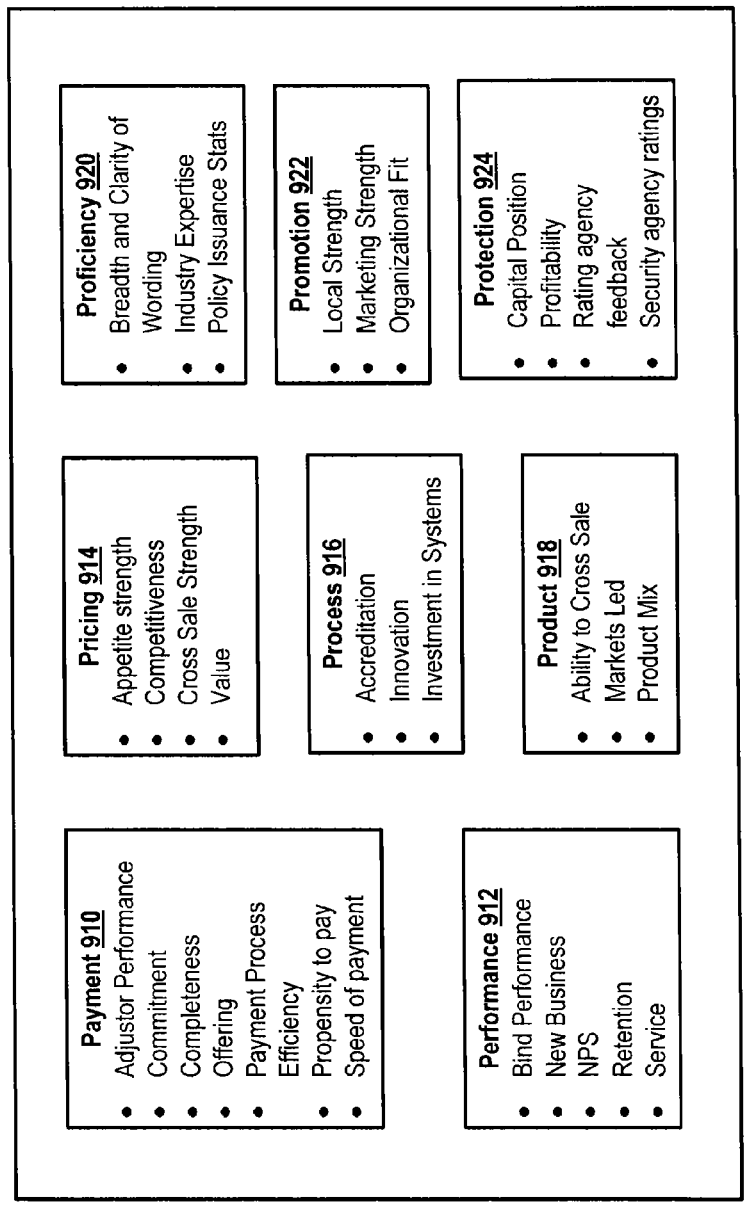
FIG. 9B is a block diagram of exemplary weighting categories for matching subscription providers to subscribers.

FIG. 9B is a diagram of exemplary metric weighting categories 926 used in the method 900 for determining rankings for the providers 104. Each of the metrics represented in the dense matrix 118 has an associated weight category with a weight factor that is based in part on customer risk preference inputs. For example, one or more metrics can be weighted based on payment 910, which can include adjustor performance, commitment, completeness, offering, payment process efficiency, propensity to pay, and speed of payment. Another weighting factor category is performance 912, which can include bind performance, new business, NPS, retention, and service. A pricing category 914 can include appetite strength, competitiveness, cross sale strength, and value. A process category 916 can include accreditation, innovation, and investment in sales. A product category 918 can include ability to cross sell, markets led, and product mix. A proficiency category can include breadth and clarity of wording, industry expertise, and policy issuance statistics. A promotion category 922 can include local strength, marketing strength, and organizational fit. A protection category 924 can include capital position, profitability, rating agency feedback, and security agency ratings.

The ranking engine 138 adaptively and predictively updates the weighting factors in each of the weighting factor categories 926 for each of the metrics based on learned trends in the market security data 150, billing data 126, and other data sources as well as the risk preferences of the subscribers 102. For example, the ranking engine 138 may alter weighting factors of metrics based upon the risk trends in the subscriber base as evidenced by the received and optionally derived risk preferences (e.g., propensity of selection by subscribers of particular providers associated with particular risk profiles).The ranking engine 138, in some embodiments, separates subscribers 102 into peer groups based upon characteristics of individual subscribers 102 (e.g., size, industry, maturity, etc.) for adaptation of weighting factors. For example, the ranking engine 138 may identify peer groups of subscribers and generate a typical set of risk preferences of the peer group for application to the weighting factors, adapting the weighting factors to risk trends within the peer group.

In some implementations, the ranking engine 128 adapts risk factors based upon learned trends in incoming data, such as survey data. For example, the subscribers 102 may provide customer feedback data associated with the weighting factor of proficiency 920, which may indicate that on average, the subscribers 102 (or one or more peer groups thereof) tend to value industry expertise over breadth and clarity of the wording of insurance policies and policy issuance statistics. The ranking engine 138 can adaptively update the weighting factors of the metrics in real-time to reflect trends in the customer feedback data as well as current and predicted states of financial and insurance markets.

Referring back to FIG. 9A, at step 908, empower ratings (ERs) for each of the carriers are determined as a function of the needs and/or risks preferences of the subscribers 102 determined at step 904 as well as one or more weighting factors associated with each of the metrics 804 of the dense matrix 118. In some implementations, the ranking engine 138 combines the weighting factors for each metric with the subscriber risk preferences received at step 904 to determine a score for each of the providers 104 with respect to the preferences of the subscriber 102. For example, the ranking engine 138 can determine a combined weighting factor for each of the metrics of the dense matrix 118 that includes an average or weighted average of the weighting factors (or identified set of weighting factors pertinent to the subscriber's peer group and/or identified subscription characteristics) and customer risk preferences for a particular entry of the dense matrix 118. The ranking engine 138 then sums the combined weighting factors associated with each grouping of categories 802 to determine compatibility scores for the providers 104 based on country, product, segment, region, or insurer. In some implementations, the compatibility scores for each of the metrics 804 of the dense matrix 118 can also be referred to as compatibility metrics. In addition, the ranking engine 138 determines whether the compatibility scores associated with each of the providers 104 have been calculated based on data entries of the dense matrix 118 that have been fully or partially inherited or inferred. If the amount of partially or fully inherited/inferred data entries is greater than a predetermined threshold for a given provider score, the ranking engine may 138 disregard the associated provider rating or output the provider rating to the user interface screen identified as a recommendation based in part upon "soft" (derived, inferred) data points. The identification, in some examples, can include an asterisk, highlight, color scheme, brief comment, or star indicating that the rating is based on inherited or inferred data.

The sum of the compatibility scores for each of the groupings, in some implementations, is translated into the ER by normalizing the sum to a range of zero to five, which can be represented by a five-star rating scale on the UI screens. The ER can also be determined for ranges other than the five-star scale, such as a percentage scale, a zero to ten point scale, a letter grade scale (e.g., A, B, C, D, F), or any other scale. In addition, ERs can be calculated with respect to each of the metric weighting categories 926. For example, the ERs can include a payment ER, a performance ER, a pricing ER, a process ER a product ER, a proficiency ER, a promotion ER, a protection ER, or an overall ER that combines the ERs for all of the metric weighting categories 926. The ERs for each of the providers 104 can be translated into provider rankings that can be displayed to the external devices 158 via a UI screen. For example, the overall ER may be presented in a first UI screen, while a breakdown of ERs into the weighting categories can be presented to the user upon selection by the user, for example through clicking on a particular recommended provider or upon a control associated with a detailed provider comparison.

FIG. 10 is an exemplary diagram of a test harness report 1000. The processing circuitry of the subscriber-provider matching system 108, for example, may output the test harness report 1000 to external devices 158 of one or more backend system managers monitoring the execution of the processes by the subscriber-provider matching system 108 to detect unexpected errors in the execution of the subscriber-provider matching process 200. In some implementations, the test harness report 1000 can include information associated with policies carried by the subscribers 102 such as type of product, effective month, expiration month, total premium amount, revenue amount, commission amount, and fees. The test harness report 1000 can also include other data points extracted from the inputs and outputs of the processes of the subscriber-provider matching system 108.

FIGS. 11-15 illustrate exemplary UI screens that are configured to receive risk preference inputs from the subscribers 102 as well as output the provider ratings to the subscribers 102 across various performance categories. The UI screens also provide real-time comparisons of one or more of the providers 104 across the various performance categories for one or more industries. In addition, the comparison and input tools of the UI screens offered to the participants of the subscriber-provider matching system 108 allow users who have little to no experience with selecting providers to interact with the subscriber-provider matching system 108 in real-time to input preferences and receive recommendations regarding which of the providers 104 are most compatible with their risk preferences.

FIG. 11 illustrates a screen shot 1100 of a user interface for selecting and reviewing a user input that includes selecting one or more risk preferences of a risk profile. In certain embodiments, the risk preferences of the subscribers 102 can be categorized into financial risk preferences and service risk preferences. For example, the financial risk preferences can include a price and total cost of risk, cover, financial rating, and claims processing of the providers 104. The service risk preferences can include expertise, innovation, market presence, continuity, and overall service experience of the providers 104. In addition, average or typical risk preference values for one or more customer peer groups can be displayed to the subscribers 102 via the user interface. For example, the peer groups can include categorical groupings of the subscribers 102 by size, industry type, region, segment, product, or all of the subscribers 102 who participate in the subscriber-provider matching environment 100. The data management engine 142 of FIG. 1, for example, can determine the typical risk preference values 1134 (illustrated as triangles, as indicated by 1134a and 1134i) for the one or more subscriber peer groups in real time as the subscribers 102 input the risk preference data to the subscriber-provider matching system 108.

As illustrated in FIG. 11, a "risk profile" pane 1102 presents the user with different user input metrics. The input metrics include "Industry", "Product", "Region", "Segment", and "Primary/Excess". The input metrics may differ depending upon the type of subscription product (e.g., insurance, reinsurance, etc.) and/or the type of subscriber (e.g., subscriber access level, stored subscriber demographic information, etc.). A first navigation control 1104, when selected, presents to the user a list of possible choices for the "Industry" (e.g., construction). A second navigation control 1106, when selected, presents the user a list of possible products such as property, automobiles. A third navigation control 1108, when selected, presents to the user a list of possible region/country (e.g., United States, Italy, all, etc.). For example, upon activation of the third navigation control 1108, for example, the user may be presented with a drop-down menu, search box, or other selection control for identifying a region/country. A fourth navigation control 1110, when selected, presents to the user a list of possible segments choices (e.g., multinational, large, medium, small, all, etc.). A fifth navigation control 1112, when selected, presents to the user a list of primary/excess choices.

A "preference for specific risk" pane 1114 presents the user with a set of slider controls associated with a set of specific risks. A first slider 1116 is provided to select a "price/total cost of risk" risk preference. For example, the user may select a value between 1 and 10 that represents the user's "price" risk preference. The highest value on the slider may represent a higher risk preference. A second slider 1118 is provided for selecting the "cover" risk by the user. The second slider 1118 shows that the user selected 6.4 for the "cover" risk. A third slider 1120 is provided for selecting the "financial rating" risk preference by the user. A fourth slider 1122 is provided for selecting "claims" risk preference. A fifth slider 1124 is provided for selecting "service" risk preference. A sixth slider 1126 is provided for selecting the "expertise" risk preference. A seventh slider 1128 is provided for selecting the "innovation" risk factor. An eighth slider 1130 is provided for selecting a "market presence" risk factor. A ninth slider 1132 is provided for selecting a "continuity" risk factor.

As illustrated, each slider 1132 is overlaid with a triangular indicator 1134 marking a value that represents the typical value of this particular risk preference submitted by other subscribers of the system 108. For example, indicator 1134a shows the preference by other subscribers for the "continuity" risk factor. The typical risk preference profile illustrated through the placement of the triangular indicators 1134 supply the user with an understanding of the risk preferences asserted by other subscribers of the system (e.g., peer subscribers or all subscribers). For a new user to the system, the indicators 1134 supply an immediate indication of potentially "reasonable" values for risk profile, as set by a greater market.

Further, in some implementations, the slider values 1138 may be set, upon initial presentation to the user, not at a default value (e.g., 1 or 10), but at a start value for the user to customize. In on example, the start values may be set to the same point as the triangular indicators 1134—the typical risk preference values as determined through combining risk preference profiles of a group of subscribers. In another example, the start values may be set to an estimated risk preference of the particular subscriber based upon past behavior of the subscriber, such as a risk profile inferred from the weighting factors associated with the user's incumbent provider or a risk profile inferred from the subscriber's risk profile(s) related to other industries 1104, products 1106, regions 1108, segments 1110, and/or primary excess 1112. If the start values are based upon other risk profiles of the same subscriber, in a particular example, the values may be developed through risk profiles correlating most closely to the present settings of the controls 1104 through 1112. For example, a risk profile associated with the region Canada may be adopted as a starting point for developing a risk profile associated with the region United States. If multiple pre-existing risk profiles correlate to the present user interface settings, the pre-existing risk profiles may be combined to derive the start values presented in the user interface 1100.

In some implementations, the positions of the sliders can correspond to specific values associated with the preferences. For example, the "preference for specific risk" pane 114 may include a slider for a speed of payment preference where lower slider values correspond to a slower speed of payment and a higher slider values correspond to a faster speed of payment. A "run for specific needs" control 1136, when selected, starts the process described herein to generate the carrier rating.

Figure 12:
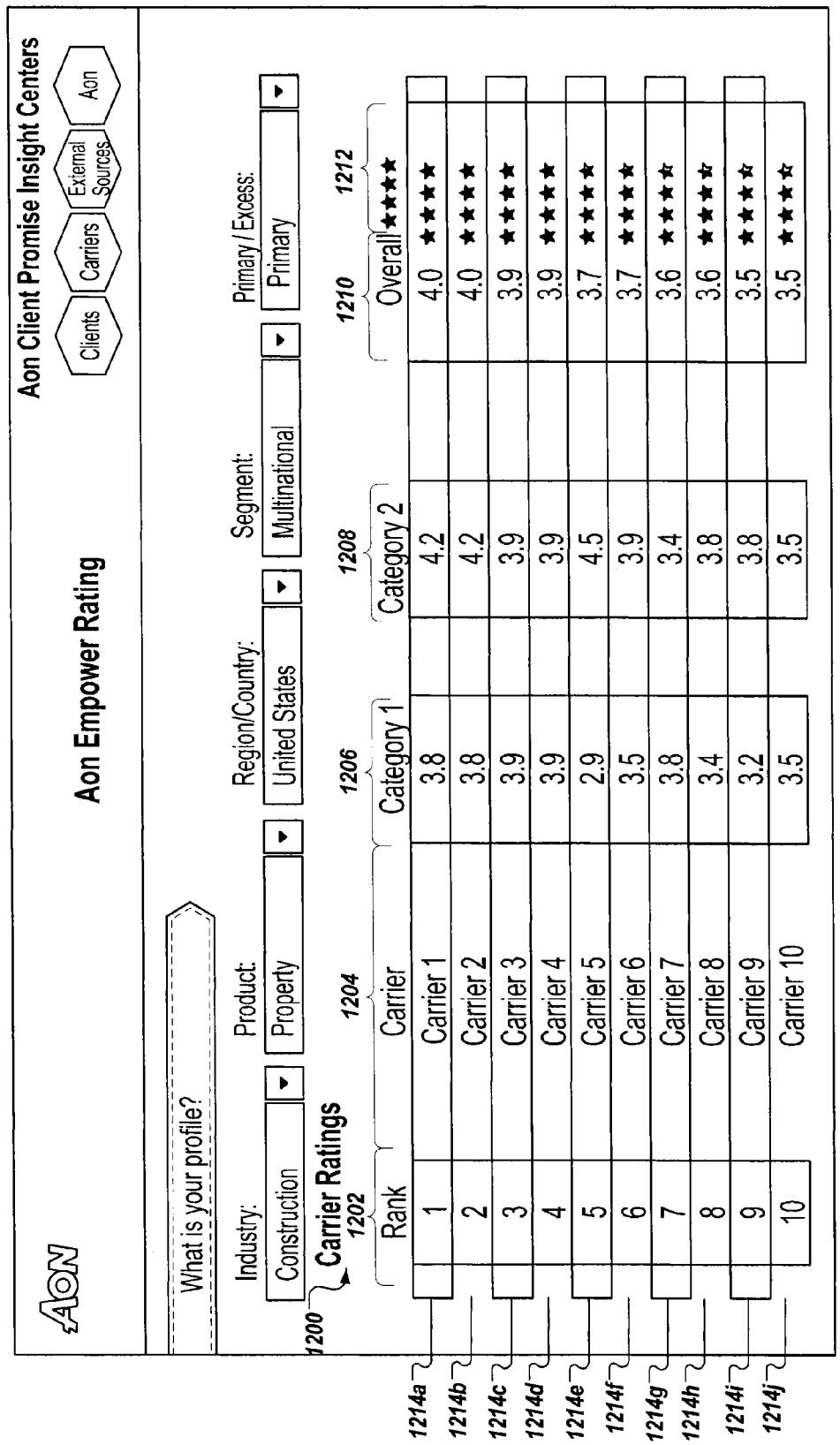

FIG. 12 is a graphical user interface for displaying provider ratings, rankings, and recommendations. The graphical user interface, for example, may be generated when the "run for specific needs" control 1136 of FIG. 11 is selected. The graphical user interface shown in FIG. 12 presents to the user an identification of provider ERs and rankings for one or more providers 104 based on one or more categories as well as an overall rating and ranking for each of the providers 104. In some implementations, the categories include the weighting factor categories 926 as described in relation to FIG. 9. For example, the ERs can include a payment ER, a performance ER, a pricing ER, a process ER a product ER, a proficiency ER, a promotion ER, a protection ER, or an overall ER that combines the ERs for all of the metric weighting categories 926. The ERs can for each of the providers 104 can be translated into provider rankings that can be displayed, for example, to the external devices 158 of FIG. 1 via a UI screen.

A "carrier ratings" pane 1200 displays the provider ratings as generated using the methodologies described herein. The "carrier ratings" pane 1200 includes for a top predetermined number of providers (e.g., top 10 providers), a rank 1202, a carrier name 1204, a first rating 1206, a second rating 1208, an overall rating 1210, and a star rating 1212. The first rating 1206 and second rating 1208 may include any of the weighting factor categories 926 described previously herein. The overall rating 1210 may be a function of the first rating 1206 and the second rating 1208. For example, the first rating 1206 and the second rating 1208 may be added, averaged, or weighted then added to obtain the overall rating 1210. Then, the star rating 1212 may be generated using a predetermined scale. For example, when the overall rating is equal to four, the star rating shows four completely filled stars. In addition, the providers and ratings displayed and sorted within the carrier ratings pane 1200 can be based on other criteria, such as region, S&P rating, segment, or product.

The carrier ratings 1202, in other embodiments, may include an indication of recommendations made based upon inferred or inherited data, as described herein. For example, a particular row 1214 may include a graphic indicator, such as a highlighting, color fill, asterisk, or brief comment indicating that the particular recommendation was identified based in part on inferred or inherited data. The graphic indicator, in some embodiments, is applied to those rows 1214 representing recommendations based upon a threshold number or percentage of derived or inherited values used in the raking calculations, or upon a threshold portion of derived or inherited values as weighted by the weighting factors applied during the ranking process.

In some implementations, in addition to displaying the first rating 1206 and the second rating 1208, the user can select one of the carrier names 1204 by touching a touchscreen or clicking a mouse on a location of the carrier name 1204 on a screen of the external device 158 displaying the user interface screen to view amplifying information associated with how the ratings were determined. If the user selects Carrier 2 on the carrier ratings pane 1200, additional user interface screens can be displayed that shows details of how the overall rating 1210 of 4.0 was determined as well as how the first rating 1206 and second rating 1208 were determined. For example, if the first rating 1206 is associated with the weighting factor category of payment 910, an additional user interface screen can display metrics, statistics, or other types of data associated with a provider's speed of payment, propensity to pay, payment process efficiency, offering, completeness, commitment, ability to pay, and adjustor performance. For example, the data associated with a provider's tendency to pay can include a percentage of incurred claims paid within a predetermined time a speed of claim settlements. In addition, the additional user interface screens can also include the metrics, data, and statistics for the selected provider as well as other providers. For example, the additional user interface screens can include an average percentage of incurred claims paid and speed of claim settlements for five, ten, or fifteen highest-ranking providers as well as average values for all providers.

The additional user interface screens can also output the provider ratings and associated metrics, statistics and data in other formats. For example, the additional user interface screens can display a number or percentage of providers that meet certain customer risk profile and preference criteria. In addition, the user interface screens can present the provider ratings and values for the weighting metric categories 926 with respect to particular geographical regions or time periods such as one year, five years, or ten years. In another example, additional user interface screens may present a comparison between ratings and/or metrics associated with an incumbent provider presently supplying a subscription product to the subscriber in comparison to the recommended providers, should the incumbent provider be missing from the presented providers (e.g., the incumbent does not match the risk profile submitted by the subscriber via the user interface 1100 of FIG. 11).

Figure 13:
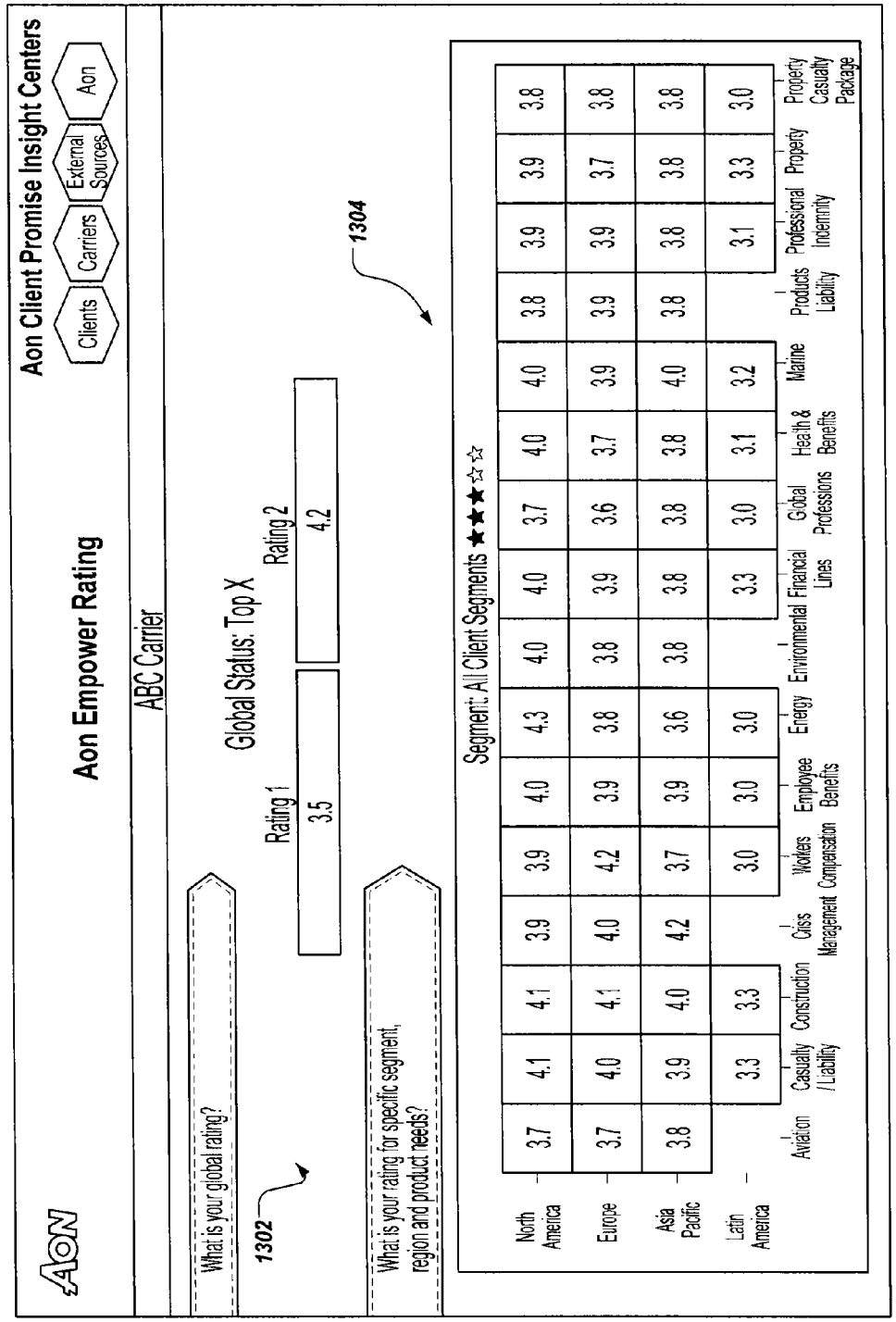

FIG. 13 is a graphical user interface for displaying ratings by categorical groupings that can include a specific segment, region, and product needs according to one example. A "global rating" pane 1302 presents to the carrier a global status rankings (e.g., top 10), a first rating, and a second rating.

The first and second ratings may include any of the weighting factor categories 926 described previously in relation to FIG. 9. A second pane 1304 presents the entity with a rating for specific segment, region, and product needs. As shown in FIG. 13, the ratings may be displayed in a tabular form. In one example, the regions may include North America, Europe, Asia Pacific, and Latin America. The segment and product needs may include, but are not limited to, aviation, casualty, construction, crisis management, workers compensation, employee benefits, energy, environmental, financial lines, global professions, health and benefits, marine, products liability, professional indemnity, property, and property casualty package. In addition, the second pane 1304 may show a star rating that represents the overall rating for all customer segments.

FIG. 14 is a graphical user interface for presenting a risk questionnaire to a user according to one example. The graphical user interface in FIG. 14 also includes a comparison of the risk preferences as indicated in responses to the risk questionnaire amongst one or more categories within a particular industry. The questionnaires may be developed to guide a novice user through the process of supplying the subscriber-provider matching system 108 with answers indicative of risk category weightings to apply in recommending providers to the subscribers. The question may vary, in some examples, based upon audience (e.g., subscriber vs. intermediary participant, level of experience the user has with the subscriber-provider system, subscriber characteristics, etc.), geographic region (e.g., grammar differences between British English and American English, etc.), and/or subscription product type desired. In some embodiments, the questionnaire may be an optional step in obtaining provider recommendations. For example, the user may have the option of defaulting to industry preferences or peer group preferences rather than stepping through the questionnaires presented through the graphical user interface of FIG. 14.

As illustrated in FIG. 14, "risk questionnaire" pane 1400 includes three navigation controls based on three weighting categories for determining the ERs of the providers 104: a first category control 1402, a second category control 1404, and a third category control 1406. The first category control 1402, second category control 1404, or third category control 1406 may correspond, for example, to any of the weighting factor categories 926 described previously in relation to FIG. 9. Upon activation of the first category control 1402, for example, the user may be presented with questions related to one of one of the first weighting factor categories 926. The user may then input a value for each protection question. For example, the user may select a number using the presented scale. FIG. 14 shows a scale from 1 to 10 for each of the protection questions although other scales may be used (e.g., 1 to 5, A to E, etc.).

Upon activation of the second category control 1404 and the third category control 1406, the user is presented with questions associated with other weighting factor categories 926. The weight of each of the metrics described previously herein, for example, may be generated as a function of the user's response to the questions. For example, the subscriber's answers to the questions presented through the user interface 1400 may be applied to sets of weighting factors to customize the weighting factors for the requesting subscriber. In one implementation, each of the titles of the questions may be controls. Upon activation of a control, the user is presented with additional information about the question.

A radar plot 1408 displays the user preference for each of the weighting factor categories 926 compared with the industry preference. The radar plot 1408 may be automatically updated based on the user's responses to the risk questionnaire. For example, the subscriber-provider matching system 108 can process subscriber responses to the risk questionnaire in real-time such that the radar plot 1408 is modified in real-time as the subscriber modifies responses to the questions. The industry preference may represent an average calculated based on other subscribers' responses to the questions, such as the user's peer group of subscribers or all subscribers of the system 108.

Although illustrated as a survey presenting a set of questions and associated scale of available responses, in other embodiments, the risk questionnaire of FIG. 14 may be presented to the user in an interactive survey form, for example, asking a series of related questions in separate screen images, where a user's response to a given question may alter the series of following questions accordingly. Other presentations are possible.

Figure 15:
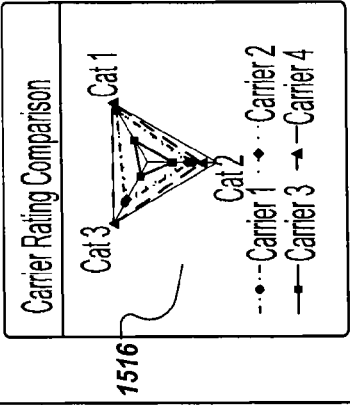

FIG. 15 is a graphical user interface for displaying provider ratings based on the risk profile and the risk questionnaire according to one example. The graphical user interface shown in FIG. 15 also provides a comparison of two or more providers 104 selected by the user with respect to one or more categories. The provider rankings are generated using the methodology shown and described in FIG. 9A. In one example, the rankings may be presented in a tabular form as shown in FIG. 15. Table 1500 include a "Rank" field 1502, a "carrier" field 1504, a first weighting factor category rating field 1506, a second weighting factor rating field 1508, a third weighting factor category rating field 1510, and a star rating field 1512. The weighting factor category weighting fields 1506, 1508, and 1510 may be any of the weighting factor categories 926 described previously herein. In addition, for each of the providers 104, the user interface presents the user with a control box 1514 to select providers 104 that the user requests to compare. A "carrier rating comparison" radar plot 1516 shows a comparison of the selected carrier using control boxes 1514. In the example shown in FIG. 15, four carriers are selected for comparison. In addition, the user's incumbent carrier may be highlighted as shown in table 1500.

The subscriber-provider matching system 108 can process the user's inputs in real-time such that the radar plot 1516 is modified in real-time as the user modifies inputs to the control boxes 1514. One of skill in the art will understand from the foregoing description that some or all of the foregoing processes may be executed automatically and/or in real-time in order to achieve real-time rendering of the radar plot 1516 as the user modifies inputs to the control boxes.

In addition, through a first navigational control 1518, the user can print the provider ratings. Through a second navigational control 1520, the user can share (e.g., email, fax, etc.) the carrier ratings. In addition, through a third control (not shown), the user can control the number of top providers to be displayed. For example, in FIG. 15, the top five providers are displayed although more or less may be displayed.

The subscriber-provider matching system 108 can also output other graphical user interface screens than those described previously with respect to FIGS. 11-15. In one implementation, the dashboard GUI engine 140 can output a carrier dashboard user interface screen to the external devices 158 of the providers 104 that provides information associated with potential customers based on responses of the subscribers 102 to the risk questionnaire and risk preference inputs. For example, the subscriber-provider matching system 108 can automatically output customer information securely to one or more top ranking providers determined by the method 900 for ranking the providers 104 via the carrier dashboard user interface screen, email, or any other type of secure notification. In addition, the customer information can be output to the providers 104 in real-time as the ranking engine 104 determines the ERs for the providers 104 in response to receiving customer risk preferences.

Figure 16A:
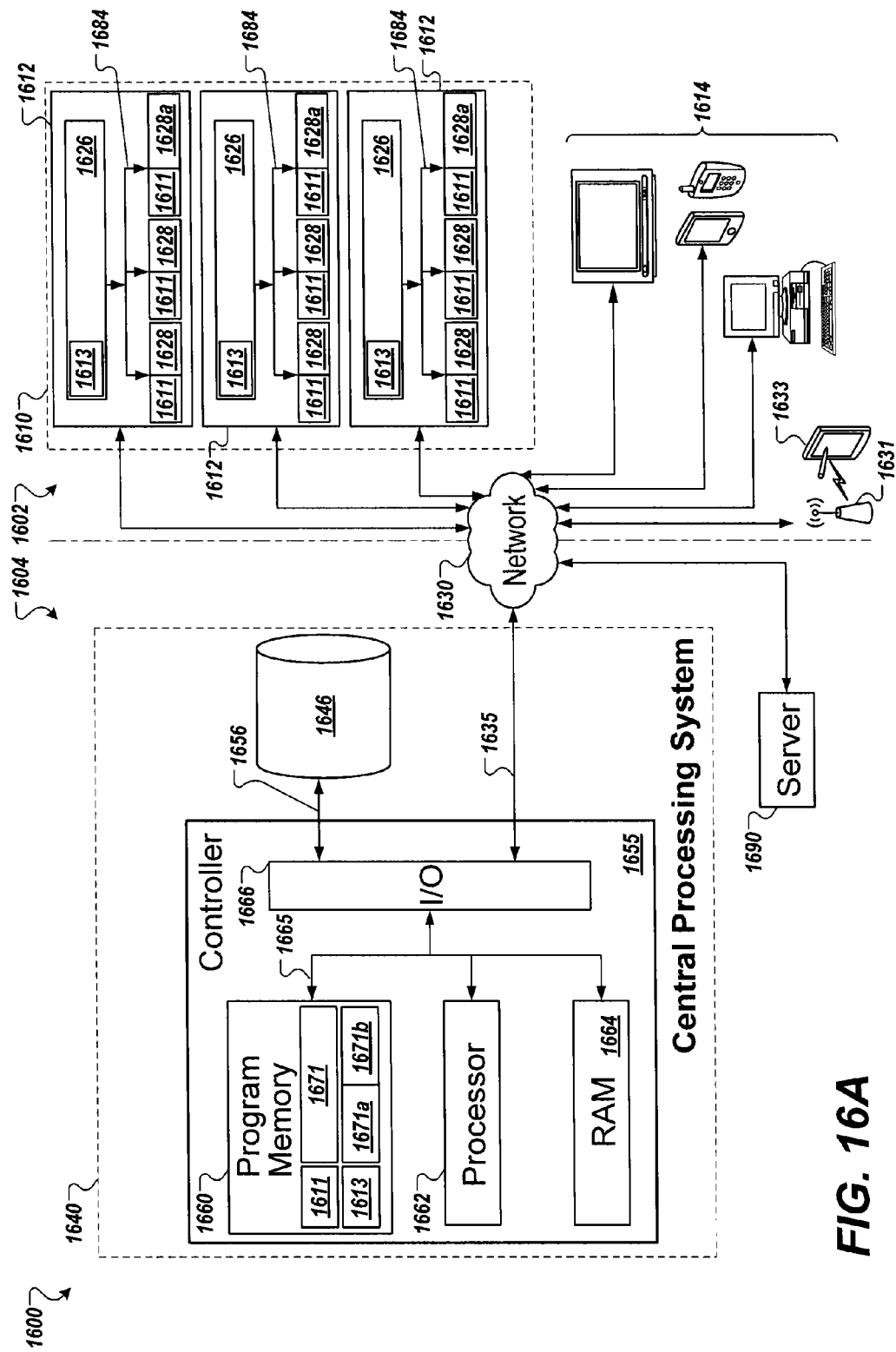
FIGS. 16A and 16B illustrate various aspects of an exemplary architecture implementing a platform for automated matching of subscribers and providers.
Figure 16B:
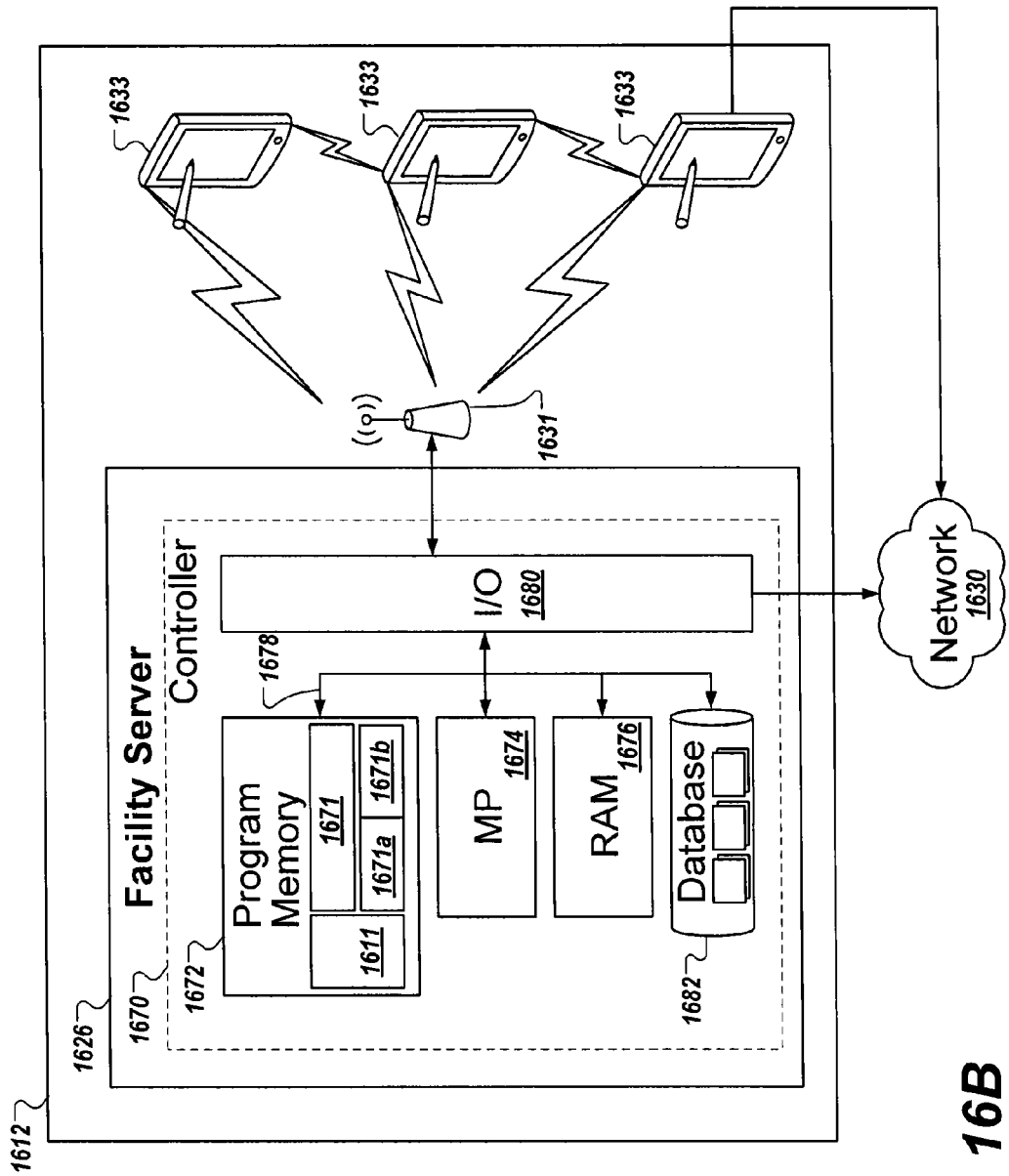

FIGS. 16A and 16B illustrate various aspects of an exemplary architecture implementing a platform 1600 for automated subscriber-provider matching. The high-level architecture includes both hardware and software applications, as well as various data communications channels for communicating data between the various hardware and software components. The platform 1600 may be roughly divided into front-end components 1602 and back-end components 1604. The front-end components 1602 are primarily disposed within a client network 1610 including one or more clients 1612. The clients 1612 may be located, by way of example rather than limitation, in separate geographic locations from each other, including different areas of the same city, different cities, different states, or even different countries. The front-end components 1602 may include a number of workstations 1628. The workstations 1628, for example, can be local computers located in the various locations 1612 throughout the network 1610 and executing various applications for ranking the providers 104 with respect to needs and/or risk preferences of the subscribers 102.

Web-enabled devices 1614 (e.g., personal computers, tablets, cellular phones, smart phones, web-enabled televisions, etc.) may be communicatively connected to locations 1612 and the system 1640 through a digital network 1630 or a wireless router 1631, as described below.

Referring now to FIG. 16A, the front-end components 1602, in some embodiments, include a number of facility servers 1626 disposed at the number of locations 1612 instead of, or in addition to, a number of workstations 1628. Each of the locations 1612 may include one or more facility servers 1626 that may facilitate communications between the web-enabled devices 1614 and the back-end components 1604 via a digital network 1630, described below, and between the terminals 1628, 1628A of the locations 1612 via the digital network 1630, and may store information for a number of customers/employees/accounts/etc. associated with each facility. Of course, a local digital network 1684 may also operatively connect each of the workstations 1628 to the facility server 1626. Unless otherwise indicated, any discussion of the workstations 1628 also refers to the facility servers 1626, and vice versa. Moreover, environments other than the locations 1612, such as the kiosks, call centers, and Internet interface terminals may employ the workstations 1628, the web-enabled devices 1614, and the servers 1626. As used herein, the term "location" refers to any of these points of contact (e.g., call centers, kiosks, Internet interface terminals, etc.) in addition to the locations 1612, etc. described above.

The front-end components 1602 communicate with the back-end components 1604 via the digital network 1630. One or more of the front-end components 1602 may be excluded from communication with the back-end components 1604 by configuration or by limiting access due to security concerns. For example, the web enabled devices 1614 may be excluded from direct access to the back-end components 1604. In some embodiments, the locations 1612 may communicate with the back-end components via the digital network 1630. In other embodiments, the locations 1612 and web-enabled devices 1614 may communicate with the back-end components 1604 via the same digital network 1630, but digital access rights, IP masking, and other network configurations may deny access of the web-enabled devices 1614. The web-enabled devices may also connect to the network 1630 via the encrypted, wireless router 1631.

The digital network 1630 may be a proprietary network, a secure public Internet, a virtual private network or some other type of network, such as dedicated access lines, plain ordinary telephone lines, satellite links, combinations of these, etc. Where the digital network 1630 includes the Internet, data communication may take place over the digital network 1630 via an Internet communication protocol. In addition to one or more web servers 1690 (described below), the back-end components 1604 may include a central processing system 1640 within a central processing facility. Of course, the locations 1612 may be communicatively connected to different back-end components 1604 having one or more functions or capabilities that are similar to the central processing system 1640. The central processing system 1640 may include processing circuitry (e.g., one or more computer processors) 1662 adapted and configured to execute various software applications and components of the platform 1600, in addition to other software applications, such as a medication management system.

The central processing system 1640, in some embodiments, further includes a database 1646 (which may include one or more databases). The database 1646 can be adapted to store data related to the operation of the platform 1600. The central processing system 1640 may access data stored in the database 1646 when executing various functions and tasks associated with the operation of the platform 1600.

Although the platform 1600 is shown to include a central processing system 1640 in communication with three locations 1612, and various web-enabled devices 1614 it should be understood that different numbers of processing systems, locations, and devices may be utilized. For example, the digital network 1630 (or other digital networks, not shown) may interconnect the platform 1600 to a number of included central processing systems 1640, hundreds of locations 1612, and thousands of web-enabled devices 1614. According to the disclosed example, this configuration may provide several advantages, such as, for example, enabling near real-time uploads and downloads of information as well as periodic uploads and downloads of information. This provides for a primary backup of all the information generated in the wireless data transfer process. Alternatively, some of the locations 1612 may store data locally on the facility server 1626 and/or the workstations 1628.

FIG. 16A also depicts one possible embodiment of the central processing system 1640. The central processing system 1640 may have a controller 1655 operatively connected to the database 1646 via a link 1656 connected to an input/output (I/O) circuit 1666. It should be noted that, while not shown, additional databases may be linked to the controller 1655 in a known manner.

The controller 1655 includes a program memory 1660, the processing circuitry 1662 (may be called a microcontroller or a microprocessor), a random-access memory (RAM) 1664, and the input/output (I/O) circuit 1666, all of which are interconnected via an address/data bus 1665. It should be appreciated that although only one microprocessor 1662 is shown, the controller 1655 may include multiple microprocessors 1662. Similarly, the memory of the controller 1655 may include multiple RAMs 1664 and multiple program memories 1660. Although the I/O circuit 1666 is shown as a single block, it should be appreciated that the I/O circuit 1666 may include a number of different types of I/O circuits. The RAM(s) 1664 and the program memories 1660 may be implemented as semiconductor memories, magnetically readable memories, and/or optically readable memories, for example. A link 1635 may operatively connect the controller 1655 to the digital network 1630 through the I/O circuit 1666.

FIG. 16B depicts one possible embodiment of the front-end components 1602 located in one or more of the locations 1612 from FIG. 16A. Although the following description addresses the design of the locations 1612, it should be understood that the design of one or more of the locations 1612 may be different from the design of others of the locations 1612. Also, each of the locations 1612 may have various different structures and methods of operation. It should also be understood that while the embodiment shown in FIG. 16B illustrates some of the components and data connections that may be present in a location 1612, it does not illustrate all of the data connections that may be present in a location 1612. For exemplary purposes, one design of a location is described below, but it should be understood that numerous other designs may be utilized.

Each of the locations 1612, as illustrated, has one or more portable computing devices 1633 (e.g., notebook computers, tablet computers, smart phones, personal data assistants, etc.) and/or a facility server 1626. The digital network 1684 and wireless router 1631 operatively connect the facility server 1626 to the number of portable computing devices 1633 and/or to other web-enabled devices 1614 and workstations 1628. The digital network 1630 may be a wide area network (WAN), a local area network (LAN), or any other type of digital network readily known to those persons skilled in the art. The digital network 1630 may operatively connect the facility server 1626, the portable computing devices 1633, the workstations 1628, and/or the other web-enabled devices 1614 to the central processing system 1640.

Each portable computing device 1633, workstation 1628, client device terminal 1628*a*, or facility server 1626 includes a controller 1670, as depicted in FIG. 16B in relation to the server 1626. Similar to the controller 1655 from FIG. 16A, the controller 1670 includes a program memory 1672, processing circuitry (e.g., one or more microcontrollers or microprocessors) 1674, a random-access memory (RAM) 1676, and an input/output (I/O) circuit 1680, all of which are interconnected via an address/data bus 1678. In some embodiments, the controller 1670 may also include, or otherwise be communicatively connected to, a database 1682. The database 1682 (and/or the database 1646 of FIG. 16A) includes data such as client records, broker, records, reinsurer information records, quote template data, and other rules and miscellaneous information. As discussed with reference to the controller 1655, it should be appreciated that although FIG. 16B depicts only one microprocessor 1674, the controller 1670 may include multiple microprocessors 1674. Similarly, the memory of the controller 1670 may include multiple RAMs 1676 and multiple program memories 1672. Although the FIG. 16B depicts the I/O circuit 1680 as a single block, the I/O circuit 1680 may include a number of different types of I/O circuits. The controller 1670 may implement the RAM(s) 1676 and the program memories 1672 as semiconductor memories, magnetically readable memories, and/or optically readable memories, for example.

Either or both of the program memories 1660 (FIG. 16A) and 1672 may also contain machine-readable instructions (i.e., software) 1671, for execution within the processing circuitry 1662 (FIG. 16A) and 1674, respectively. The software 1671 may perform the various tasks associated with operation of the location or locations, and may be a single module 1671 or a number of modules 1671*a*, 1671*b*. While the software 1671 is depicted in FIGS. 16A and 16B as including two modules, 1671*a* and 1671*b*, the software 1671 may include any number of modules accomplishing tasks related to location operation.

In addition to the controller 1670, the portable computing devices 1633, the workstations 1628 and the other web-enabled devices 1614 may further include a display and a keyboard as well as a variety of other input/output devices (not shown) such as a scanner, printer, mouse, touch screen, track pad, track ball, isopoint, voice recognition system, digital camera, bar code scanner, RFID reader, etc. A customer 102 or carrier 104 may sign on and occupy each portable computing device 1633, workstation 1628 or client device terminal 1628*a* to assist the employee in performing his or her duties. Employees may sign onto the portable computing device 1633, workstation 1628 or the client device terminal 1628*a* using any available technique, such as entering a user name and password. If an employee signs on to the system using a portable computing device 1633, the network 1684 communicates this information to the facility server 1626, so that the controller 1670 may identify which employees are signed onto the platform 1600 and which portable computing device 1633, workstation 1628 or client device terminal 1628*a* the employee is signed onto.

Various software applications resident in the front-end components 1602 and the back-end components 1604 implement functions related to location operation, and provide various user interface means to allow users (e.g., brokers) to access the platform 1600. One or more of the front-end components 1602 and/or the back-end components 1604 may include a user-interface application 1611 for allowing a user to input and view data associated with the platform 1600, and to interact with the platform described herein. In one embodiment, the user interface application 1611 is a web browser client, and the facility server 1626 or the central processing system 1640 implements a server application 1613 for providing data to the user interface application 1611. However, the user interface application 1611 may be any type of interface, including a proprietary interface, and may communicate with the facility server 1626 or the central processing system 1640 using any type of protocol including, but not limited to, file transfer protocol (FTP), telnet, hypertext-transfer protocol (HTTP), etc. Moreover, some embodiments may include the user interface application 1611 running on one of the web-enabled devices 1614, while other embodiments may include the application 1611 running on the portable computing device 1633 in a location 1612. The central processing system 1640 and/or the facility server 1626 may implement any known protocol compatible with the user-interface application 1611 running on the portable computing devices 1633, the workstations 1628 and the web-enabled devices 1614 and adapted to the purpose of receiving and providing the necessary information during the data transfer process.

Figure 16C:
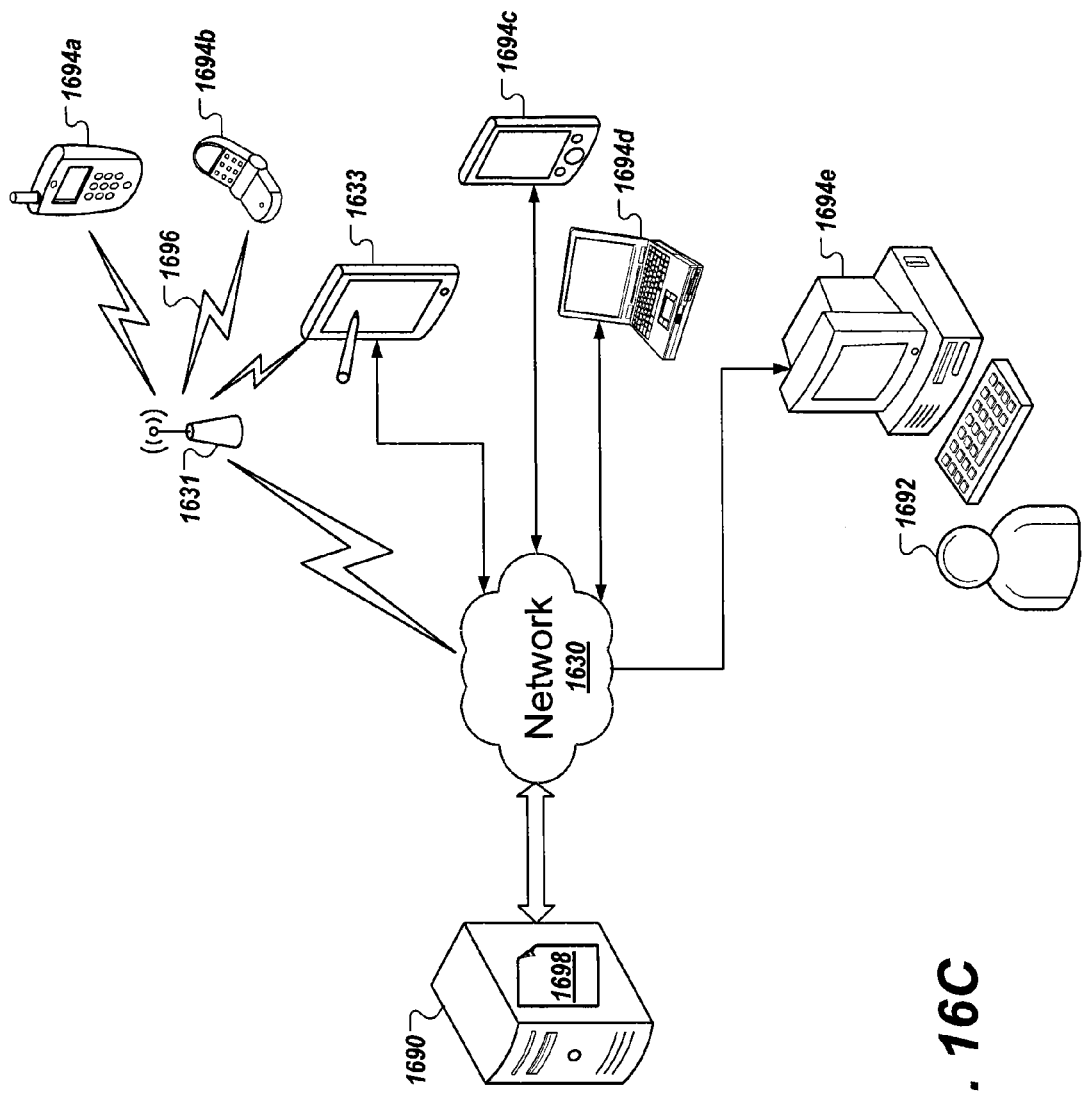
FIGS. 16C and 16D illustrate an example server interface for connecting user computing devices within a platform for automated matching of subscribers and providers.

For purposes of implementing the platform 1600, the user interacts with location systems (e.g., the central processing system 1640) via a number of web pages. FIG. 16C depicts a web server 1690 connected via the network 1630 to a number of portable computing devices 1633 and other web-enabled devices through which a user 1692 may initiate and interact with the platform 1600. The web enabled devices may include, by way of example, a smart-phone 1694*a*, a web-enabled cell phone 1694*b*, a tablet computer 1633, a personal digital assistant (PDA) 1694*c*, a laptop computer 1694*d*, a desktop computer 1694*e*, a portable media player (not shown), etc. Of course, any web-enabled device appropriately configured may interact with the platform 1600. The web-enabled devices 1633 and 1694 need not necessarily communicate with the network 1630 via a wired connection. In some instances, the web enabled devices 1633 and 1694 may communicate with the network 1630 via wireless signals 1696 and, in some instances, may communicate with the network 1630 via an intervening wireless or wired device 1631, which may be a wireless router, a wireless repeater, a base transceiver station of a mobile telephony provider, etc. Each of the web-enabled devices 1633 and 1694 may interact with the web server 1690 to receive web pages, such as the web page 1698 depicted in FIG. 16C, for display on a display associated with the web-enabled device 1633 and 1694. It will be appreciated that although only one web server 1690 is depicted in FIG. 16C, multiple web servers 1690 may be provided for the purpose of distributing server load, serving different web pages, implementing different portions of the location web interface, etc.

Figure 16D:
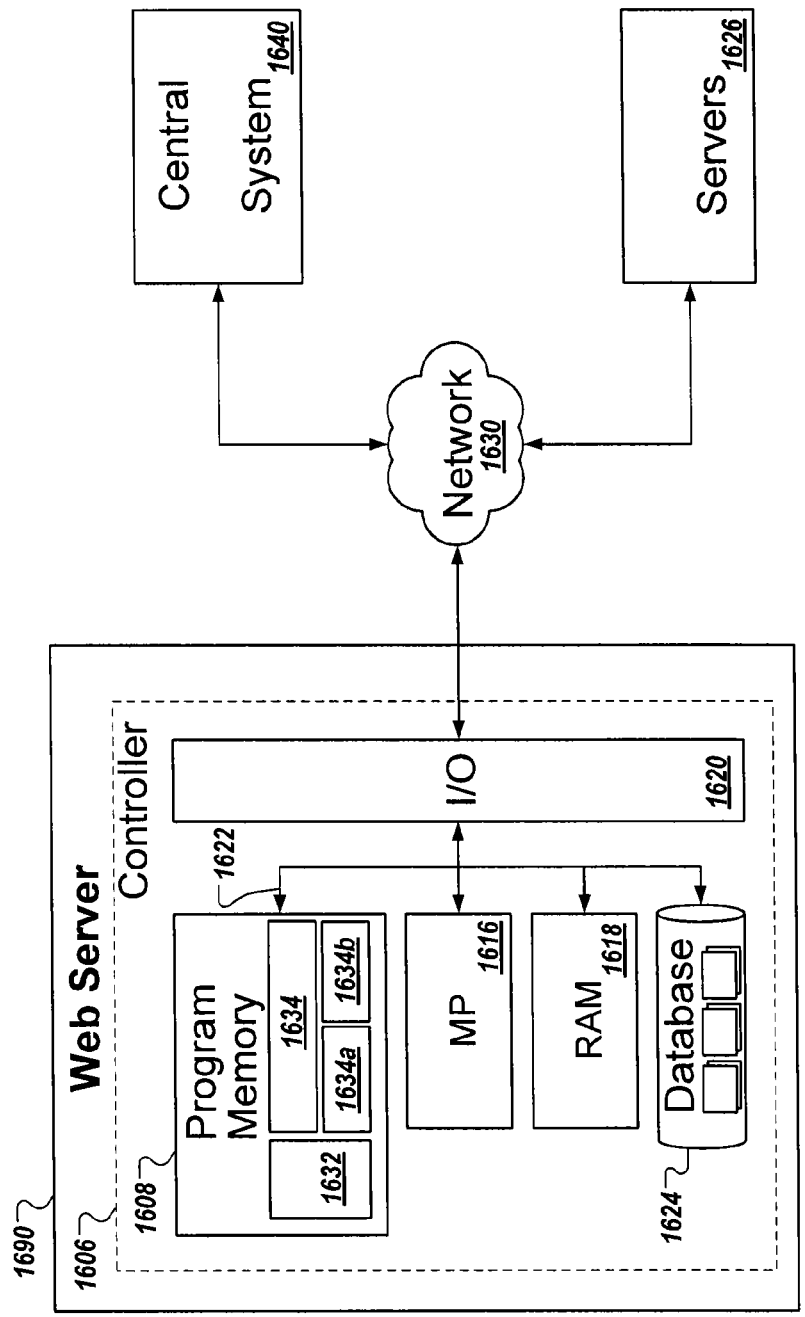

Turning now to FIG. 16D, the web server 1690, like the facility server 1626, includes a controller 1606. Similar to the controllers 1655 and 1670, the controller 1606 includes a program memory 1608, processing circuitry (e.g., one or more microcontrollers or microprocessors) 1616, a random-access memory (RAM) 1618, and an input/output (I/O) circuit 1620, all of which are interconnected via an address/data bus 1622. In some embodiments, the controller 1606 may also include, or otherwise be communicatively connected to, a database 1624 or other data storage mechanism (e.g., one or more hard disk drives, optical storage drives, solid state storage devices, etc.). The database 1624 may include data such as customer web profiles, product data, web page templates and/or web pages, and other data necessary to interact with the user 1692 through the network 1630. As discussed with reference to the controllers 1655 and 1670, it should be appreciated that although FIG. 16D depicts only one microprocessor 1616, the controller 1606 may include multiple microprocessors 1616. Similarly, the memory of the controller 1606 may include multiple RAMs 1618 and multiple program memories 1608. Although the FIG. 16D depicts the I/O circuit 1620 as a single block, the I/O circuit 1620 may include a number of different types of I/O circuits. The controller 1606 may implement the RAM(s) 1618 and the program memories 1608 as semiconductor memories, magnetically readable memories, and/or optically readable memories, for example.

In addition to being connected through the network 1630 to the user devices 1633 and 1694, as depicted in FIG. 16C, FIG. 16D illustrates that the web server 1690 may also be connected through the network 1630 to the central processing system 1640 and/or one or more facility servers 1626. As described below, connection to the central processing system 1640 and/or to the one or more facility servers 1626 facilitates the platform 1600.

The program memory 1608 and/or the RAM 1618 may store various applications for execution by the processing circuitry 1616. For example, an application 1632 may provide a user interface to the server, which user interface may, for example, allow a network administrator to configure, troubleshoot, or test various aspects of the server's operation, or otherwise to access information thereon. A server application 1634 operates to populate and transmit web pages to the web-enabled devices 1694, receive information from the user 1692 transmitted back to the server 1690, and forward appropriate data to the central processing system 1640 and the facility servers 1626, as described below. Like the software 1671, the server application 1634 may be a single module 1634 or a number of modules 1634*a*, 1634*b*. While the server application 1634 is depicted in FIG. 16D as including two modules, 1634*a* and 1634*b*, the server application 1634 may include any number of modules accomplishing tasks related to implantation of the web server 1690. By way of example, the module 1634*a* may populate and transmit the web pages and/or may receive and evaluate inputs from the user 1692 to facilitate in the wireless transfer of data from a first tablet to a second tablet, while the module 1634*b* may communicate with one or more of the back end components to provide the requested data.

Typically, a user may launch or instantiate a user interface application (e.g., a web browser or other client application) from a web-enabled device, such as the web-enabled devices 1633 and 1694, to access the web server 1690 cooperating with the system 1640 to implement the platform 1600.

One or more processors can be utilized to implement any functions and/or algorithms described herein, unless explicitly stated otherwise. Additionally, any functions and/or algorithms described herein, unless explicitly stated otherwise, can be performed upon virtual processing circuitry (e.g., one or more virtual processors, for example on one or more physical computing systems such as a computer farm or a cloud drive).

Reference has been made to flowchart illustrations and block diagrams of methods, systems and computer program products according to implementations of this disclosure. Aspects thereof are implemented by computer program instructions. These computer program instructions may be provided to processing circuitry of a general purpose computer, special purpose computer, or other programmable data processing apparatus to produce a machine, such that the instructions, which execute via the processing circuitry of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processing circuitry (e.g., processors and/or programmable circuits) configured to execute program code and/or computer instructions to execute the functions, processes and algorithms described herein. Additionally, some implementations may be performed on modules or hardware not identical to those described. Accordingly, other implementations are within the scope that may be claimed.

The invention claimed is:

1. A method, comprising:
    gathering, via a network from one or more remote computing systems, a plurality of claims data, a plurality of performance data, and a plurality of service data regarding a plurality of products provided by a plurality of providers;
    determining, by processing circuitry of a computing device based on the plurality of claims data, the plurality of performance data, and the plurality of service data, a plurality of provider metrics comprising one or more provider metrics for each provider of the plurality of providers;
    determining, by the processing circuitry, categorical groupings of the plurality of provider metrics;
    organizing, by the processing circuitry, the categorical groupings of the provider metrics into a sparse data matrix having a number of rows corresponding to a number of combinations of the categorical groupings and a number of columns corresponding to a sum of a number of the categorical groupings and a number of the plurality of the provider metrics, wherein a total number of the plurality of provider metrics is smaller than a total number of entries in the sparse data matrix resulting in a plurality of unpopulated entries in the sparse data matrix;
    for each unpopulated entry of the plurality of unpopulated entries of the sparse data matrix, populating, by the processing circuitry based on an amount of correlation between the respective unpopulated entry and one or more populated entries of the sparse data matrix, a corresponding entry in a dense data matrix, wherein the dense data matrix comprises the plurality of metrics of the sparse data matrix;
    causing presentation, in real time responsive to receiving a request from a user at a remote computing device for a product of the plurality of products from a provider of the plurality of providers, a first graphical user interface for providing a plurality of risk preferences of the user, the first graphical user interface including a typical risk preference value for each of the plurality of risk preferences of a subscriber peer group of the user;
    receiving, from the user of the remote computing device via the first graphical user interface, indication of risk preference values for each of the plurality of risk preferences, each risk preference of the plurality of risk preferences corresponding to a respective provider attribute of a plurality of provider attributes;
    weighting each entry of the one or more entries of the dense data matrix according to a set of weighting factors to produce a weighted dense data matrix, wherein the weighting of each entry of the one or more entries is based at least in part on the received risk preference values for each of the plurality of risk preferences from the user at the first graphical user interface;
    calculating, by the processing circuitry based on the weighted dense data matrix, one or more relationships between the user and each provider of the plurality of providers; and
    rating, by the processing circuitry, the plurality of providers based at least on part on the one or more relationships.

2. A non-transitory computer readable medium having instructions stored thereon, wherein the instructions, when executed by processing circuitry, cause the processing circuitry to:
    receive, from a remote data source, data records corresponding to a plurality of providers, the data records including real-time indications of a current trading status for each of the plurality of providers;
    using information in the data records, update a plurality of metrics for each provider of the plurality of providers within a sparse data matrix, wherein
        each metric of the plurality of metrics corresponds to at least one provider attribute of a plurality of provider attributes,
        the sparse data matrix comprises a plurality of entries, each entry corresponding to a) a particular combination of a plurality of categorical groupings, b) a particular provider attribute, and c) a particular provider of the plurality of providers, wherein each grouping of the plurality of categorical groupings represents at least one of a particular geographic region of a plurality of geographic regions and a particular product of a plurality of products, and
        the sparse data matrix comprises a plurality of unpopulated entries, each unpopulated entry representing a lack of information in the data records for a corresponding combination of provider, categorical grouping, and attribute;
    using the updated sparse data matrix, update a dense data matrix, wherein updating the dense data matrix comprises, for each unpopulated entry of the plurality of unpopulated entries of the sparse data matrix, populating, based on an amount of correlation between the respective unpopulated entry and one or more populated entries of the sparse data matrix, a corresponding entry in the dense data matrix, wherein the dense data matrix comprises a same total number of entries as the sparse data matrix;

cause presentation, in real time responsive to receiving a request from a user at a remote computing device for a product of the plurality of products from a provider of the plurality of providers, of a first graphical user interface for providing a plurality of risk preferences of the user, the first graphical user interface including a typical risk preference value for each of the plurality of risk preferences of a subscriber peer group of the user;

receive, from the user of the remote computing device via the first graphical user interface, indication of risk preference values for each of the plurality of risk preferences, each risk preference of the plurality of risk preferences corresponding to a respective provider attribute of the plurality of provider attributes;

weight each entry of the one or more entries of the dense data matrix according to a set of weighting factors, wherein the weighting of each entry of the one or more entries is based at least in part on the received risk preference values for each of the plurality of risk preferences from the user at the first graphical user interface;

using the dense data matrix, calculate, in real time responsive to receiving indication of the risk preference values at the first graphical user interface, a plurality of compatibility metrics corresponding to at least a portion of the plurality of providers, wherein each compatibility metric represents compatibility between the respective provider of the plurality of providers and the user for fulfillment of a type of transaction based on the plurality of risk preferences, wherein the type of transaction relates to at least one of i) a particular product of the plurality of products and ii) a particular geographic region of the plurality of geographic regions;

rate, based upon the plurality of compatibility metrics, the plurality of providers; and responsive to receiving the indication of the risk preference values at the first graphical user interface from the remote computing device, cause presentation, in real time to the user via the remote computing device, of a second graphical user interface for providing identification of at least two providers of the plurality of providers identified as top-rated providers.

3. The non-transitory computer readable medium of claim 2, wherein the plurality of risk preferences comprises at least one of a financial rating risk preference and a service risk preference.

4. The non-transitory computer readable medium of claim 2, wherein:
receiving the data records comprises extracting, from one or more automatically updated data sources, market security data indicating an amount of financial security of the plurality of providers and billing data including transactional details associated with insurance billing; and
the instructions, when executed by the processing circuitry, further cause the processing circuitry to populate a second plurality of metrics for each provider of the plurality of providers within the sparse data matrix based on the extracted market security data and the extracted billing data.

5. The non-transitory computer readable medium of claim 2, wherein:
receiving the data records comprises extracting, from one or more data sources, survey data from one or more participants indicating a level of satisfaction of performance of the plurality of providers.

6. The non-transitory computer readable medium of claim 5, wherein the instructions, when executed by the processing circuitry, cause the processing circuitry to:
analyze the survey data to determine one or more trends; and
update the set of weighting factors associated with the one or more entries of the dense data matrix based on the one or more trends.

7. The non-transitory computer readable medium of claim 5, wherein receiving the data records comprises automatically detecting survey data updates from the one or more data sources at a plurality of update frequencies.

8. The non-transitory computer readable medium of claim 2, wherein populating the plurality of metrics within the sparse data matrix comprises:
determining categorical groupings of the plurality of metrics; and
organizing the categorical groupings into the sparse data matrix having a number of rows corresponding to a number of combinations of the categorical groupings and a number of columns corresponding to a sum of a number of the categorical groupings and a number of the plurality of the provider metrics.

9. The non-transitory computer readable medium of claim 8, wherein the categorical groupings comprise at least one of provider, country, segment, and insurer.

10. The non-transitory computer readable medium of claim 8, wherein the instructions, when executed by the processing circuitry, further cause the processing circuitry to:
cause presentation, in real time responsive to receiving the indication of the risk preference values at the first graphical user interface from the remote computing device, of a third graphical user interface comprising identification of provider ratings for a particular provider of the plurality of providers based on one or more categorical groupings of the plurality of compatibility metrics.

11. The non-transitory computer readable medium of claim 2, wherein the instructions, when executed by the processing circuitry, further cause the processing circuitry to, prior to preparing the second graphical user interface, rank the plurality of providers.

12. The non-transitory computer readable medium of claim 11, wherein ranking the plurality of providers comprises determining rankings for the plurality of providers for each of a plurality of metric weighting categories.

13. The non-transitory computer readable medium of claim 2, wherein the instructions, when executed by the processing circuitry, further cause the processing circuitry to, prior to calculating the plurality of compatibility metrics:
cause presentation, in real time responsive to receiving the indication of the risk preference values at the first graphical user interface from the remote computing device, of a third graphical user interface comprising a comparison of the risk preferences of the user with other users within a predetermined industry for two or more compatibility metric categories based on one or more responses to a risk questionnaire.

14. The non-transitory computer readable medium of claim 13, wherein the instructions, when executed by the processing circuitry, further cause the processing circuitry to:
receive, from the user via the third graphical user interface, the one or more responses to the risk questionnaire; and update, in real-time in response to receiving the one or more responses to the risk questionnaire via a refresh of the third graphical user interface, the comparison of the risk preferences of the user and the other users within the predetermined industry.

15. The non-transitory computer readable medium of claim 2, wherein the instructions, when executed by the processing circuitry, further cause the processing circuitry to:
cause presentation, in real time responsive to receiving the indication of the risk preference values at the first graphical user interface from the remote computing device, of a third graphical user interface comprising a comparison of at least two providers of the plurality of providers across one or more compatibility metric categories.

16. The non-transitory computer readable medium of claim 15, wherein the instructions, when executed by the processing circuitry, further cause the processing circuitry to:
receive, from the user via the third graphical user interface, two or more provider comparison selections; and
update, in real-time in response to receiving the two or more provider comparison selections via a refresh of the third graphical user interface, the comparison of the at least two providers of the plurality of providers across the one or more compatibility metric categories.

* * * * *